US011572007B2

(12) United States Patent
Dannar et al.

(10) Patent No.: US 11,572,007 B2
(45) Date of Patent: Feb. 7, 2023

(54) MOBILE PLATFORM SYSTEMS AND METHODS

(71) Applicant: DD Dannar LLC, Muncie, IN (US)

(72) Inventors: Gary Don Dannar, Muncie, IN (US); Stephen T. Hung, Auburn, AL (US); Daniel Steven Genord, Walled Lake, MI (US)

(73) Assignee: DD Dannar, LLC, Muncie, IN (US)

( * ) Notice: Subject to any disclaimer, the term of this patent is extended or adjusted under 35 U.S.C. 154(b) by 57 days.

(21) Appl. No.: 16/972,393

(22) PCT Filed: Jun. 6, 2019

(86) PCT No.: PCT/US2019/035784
§ 371 (c)(1),
(2) Date: Dec. 4, 2020

(87) PCT Pub. No.: WO2019/236840
PCT Pub. Date: Dec. 12, 2019

(65) Prior Publication Data
US 2021/0229591 A1    Jul. 29, 2021

Related U.S. Application Data

(60) Provisional application No. 62/682,145, filed on Jun. 7, 2018.

(51) Int. Cl.
*B60P 3/00*    (2006.01)
*B60P 3/42*    (2006.01)
(Continued)

(52) U.S. Cl.
CPC .............. *B60P 3/42* (2013.01); *B60K 17/358* (2013.01); *B60K 1/00* (2013.01); *B60Y 2200/15* (2013.01);
(Continued)

(58) Field of Classification Search
CPC ........... B60P 3/42; B60K 1/00; B60K 17/358; B60Y 2200/15; B60Y 2200/25
See application file for complete search history.

(56) References Cited

U.S. PATENT DOCUMENTS

D176,400 S  *  12/1955  Norman et al. ............. D10/102
6,396,239 B1 *   5/2002  Benn ....................... H02S 30/20
                                                     320/101
(Continued)

FOREIGN PATENT DOCUMENTS

CN         105569110 A    5/2016
WO       2014039041 A1    3/2014

OTHER PUBLICATIONS

International Search Report dated Aug. 27, 2019 in parent PCT Patent Application No. PCT/US2019/035784.
(Continued)

*Primary Examiner* — Hau V Phan
(74) *Attorney, Agent, or Firm* — Fox Rothschild LLP

(57) ABSTRACT

A mobile work system and methods for operationally receiving a work performing and/or energy delivering attachment. A work platform is powered by a power output device and includes a source of electricity for powering the attachment. The platform has a first end and a second end generally opposite the first end. A first attachment interface is connected to the first end, and a second attachment interface, substantially operationally equivalent to the first attachment interface, is connected to the second end. The first end of the platform also includes a first steering mechanism, and the second end includes a second steering mechanism substantially operationally equivalent to the first steering mechanism, whereby the platform is configured to be propelled and steered in a first direction and propelled and steered in a
(Continued)

second direction generally opposite the first direction by the first and second steering mechanisms, respectively.

35 Claims, 26 Drawing Sheets

(51) Int. Cl.
*B60K 17/34* (2006.01)
*B60K 1/00* (2006.01)

(52) U.S. Cl.
CPC ..... *B60Y 2200/25* (2013.01); *B60Y 2200/415* (2013.01)

(56) References Cited

U.S. PATENT DOCUMENTS

| | | | |
|---|---|---|---|
| 7,689,921 B2 | 3/2010 | Rajarajan et al. | |
| D632,613 S * | 2/2011 | Allaire | D12/12 |
| 8,065,455 B2 | 11/2011 | Hilscher et al. | |
| 9,203,257 B1 * | 12/2015 | Zaman | H02J 7/35 |
| 9,828,049 B2 | 11/2017 | Lyle et al. | |
| D849,598 S * | 5/2019 | Schroeder | D12/1 |
| D858,351 S * | 9/2019 | Schroeder | D12/1 |
| 2003/0164255 A1 | 9/2003 | Borroni-Bird et al. | |
| 2010/0163330 A1 | 7/2010 | Halliday | |
| 2010/0275472 A1 | 11/2010 | Cunningham | |
| 2012/0216770 A1 * | 8/2012 | Brun | B60W 10/06 |
| | | | 123/179.28 |
| 2013/0062966 A1 | 3/2013 | Verghese et al. | |
| 2015/0217819 A1 | 8/2015 | Pojidaev | |
| 2016/0121947 A1 | 5/2016 | Lyle et al. | |
| 2016/0129958 A1 * | 5/2016 | Byrnes | B60L 50/60 |
| | | | 180/12 |
| 2017/0240008 A1 * | 8/2017 | Garagashyan | B60C 23/10 |
| 2017/0240169 A1 | 8/2017 | Coulter et al. | |
| 2018/0037108 A1 | 2/2018 | Richter et al. | |
| 2018/0141463 A1 | 5/2018 | Healy | |
| 2018/0279631 A1 * | 10/2018 | Darling | A01K 45/005 |

OTHER PUBLICATIONS

International Preliminary Report on Patentability dated Dec. 8, 2020 in parent PCT Patent Application No. PCT/US2019/035784.
Brazil Office Action, dated Sep. 13, 2022 in counterpart Patent Application No. BR112020024804-5.

* cited by examiner

VEHICLE-LEVEL SYSTEMS

SYSTEMS ARE SHOWN IN FAR LEFT COLUMN EACH IN ITS OWN ROW, AND SUBSYSTEMS/VARIATIONS FOR A GIVEN SYSTEM ARE SHOWN TO THE RIGHT IN EACH ROW

| | | | | | | |
|---|---|---|---|---|---|---|
| HAS A MECHANICAL FRAME | FRAME HAS ATTACHMENT INTERFACES | FRAME HAS NO DESIGNATED FRONT OR REAR | FRAME OK W VARIOUS "SUSPENSIONS" | | | |
| HAS ELECTRICAL SYSTEM | ELECTRICAL ATTACHMENT INTERFACES | ELECTRICAL SYSTEM HAS POWER RAILS | FLEXIBLE PHYSICAL CONFIGURATION | EPWR IMPORT/ CHARGING CAPABILITY | EPWR EXPORT CAPABILITY & FLEXIBILITY | HAS AN ELECTRIC PTO |
| HAS A FLUID POWER SYSTEM | FLUID POWER ATTACHMENT INTERFACES | FLUID POWER SYSTEM HAS PRESSURE RAILS | FLEXIBLE EPWR SYSTEM CONFIGURATION (162) | | | |
| HAS A THERMAL MGT SYSTEM | THERMAL MGT FOR POWER SYS + BODY/CAB | REFRGHT SYS ALSO CHILLS AIR OR COOLANT | FLEXIBLE FLUID POWER CONFIGURATION | HAS A MECHANICAL PTO | | |
| HAS OPEN CMD/COMM BUS SYSTEM | CMD/COMM SYSTEM CLTS PWR SYSTEMS | CMD/COMM SYS ALLOWS INFO RETRIEVAL | THERMAL MGT SYSTEM IS EXPANDABLE | | | |
| | | | CMD/COMM SYS FLEXIBLE WRT CONTROLS | BY-WIRE ATTACHMENT CONTROLS | BY-WIRELESS ATTACHMENT CONTROLS | REMOTE ATTACHMENT CONTROLS |

SYSTEM-LEVEL

SYSTEMS ARE SHOWN IN FAR LEFT COLUMN EACH IN ITS OWN ROW, AND SUBSYSTEM/VARIATIONS FOR A GIVEN SYSTEM ARE SHOWN TO THE RIGHT IN EACH ROW

| System | Col 2 | Col 3 | Col 4 | Col 5 | Col 6 |
|---|---|---|---|---|---|
| HAS A USER INTERFACE MANAGER/BUS | UIM FLEXIBLE WRT TO CONTROLS | UIM HANDLES REDUNDANT CONTROLS | FLEXIBLE CONTROLS CONFIGURATION | ADAPTERS FOR CONTROLS CONFIGURATIONS | UI BUS REACHES OFF-BOARD CNTRLS | REMOTE MOBILITY CONTROLS |
| HAS A ATTACHMENT COMM BUS | ADAPTERS FOR NONSTANDARD ATTACHMENTS | HAS A MOBILITY CONTROLLER | MOBILITY IS A STANDARD ATTACHMENT | 4WD + 4WS | BY-WIRE MOBILITY CONTROLS | BY-WIRELESS MOBILITY CONTROLS |
| HAS A POWER MANAGER AND COMM BUS | PM FLEXIBLE TO PWR COMP LOCATIONS | PM IS FLEXIBLE WRT ENERGY TYPES | ADAPTERS IF NEEDED FOR MULTI CHRGERS | ADAPTERS IF NEEDED FOR MULTI EXPORTS | | |
| HAS AN ENERGY MANAGER/BUS | EM IS FLEXIBLE WRT ENERGY LOCATIONS | EM IS FLEXIBLE WRT ENERGY TYPE | EM HANDLES MULTI ENERGY COMPONENTS | ADAPTER FOR MULTI ENERGY COMP CTRL | | |
| HAS A VEHICLE ENERGY SYS INTEGRATOR (180) | VESI VERIFIES PROPER CONTENT | VESI CONVEYS PROPER PERF LIMITS FOR TASK | | | | |
| HAS MOBILE ENERGY SYS OPTIMIZER (182) | MESO OPTIMIZES CONTENT DEFN | MESO CAN BE ON-BOARD TAK INTRPRTR | MESO CAN BE OFF-BOARD TASK INTRPRTR | | | |

US 11,572,007 B2

MOBILE PLATFORM SYSTEMS AND METHODS

CROSS-REFERENCE TO RELATED APPLICATION

This application claims benefit of U.S. Provisional Patent Application No. 62/682,145, filed on Jun. 7, 2018, the content of which is hereby incorporated herein in its entirety.

FIELD

Implementations of this disclosure relate to, among other things, systems and methods of mobile work platforms having capable of multiple work configurations.

BACKGROUND

Historically, off-road/on-road work vehicles have been machines driven by steam, coal, diesel-fueled internal combustion engines, on tracks and/or wheels. These vehicles were used for agricultural, industrial, and construction purposes and include machines such as threshers, harvesters, tractors, loaders, bulldozers, forklifts, pavers, graders, dump trucks, boring machines, excavators, and the like (referred to collectively as, "mobile work machines"). The mobile work machines may work with mechanical and/or hydraulic accessories to perform the specific operations for which the mobile work machines were designed. Optimization of the size and design of the engines driving the mobile work machines led to configurations with the engine, operator's station, or cab, and task-specific accessories at fixed locations on the mobile work machine, such as where the engine or a cab was at the front of the mobile work machine, and the task equipment was on the rear; or, where the task equipment was up front and the engine was up front but was behind the task equipment, and the cab was in the rear, etc.

In addition, the historic development of the different uses of the mobile work machines led to specialized designs and single purpose, or sometimes dual purpose, mobile work machines being provided to an end user, sometimes leaving the end user to remove and replace attachments on a customized basis to achieve a different use for a mobile work machine. From an end-user standpoint, the inflexibility of the mobile work machine has often resulted in the necessity to purchase multiple mobile work machines to achieve a broad range of uses, oftentimes resulting in substantial down time when each individual specialized mobile work machine is not needed.

Accordingly, there exists a need for a flexible mobile system that reduces or eliminates the necessity of multiple mobile work machines to achieve a broad range of uses.

SUMMARY

In one implementation, the present disclosure includes a mobile work, or, platform, system and methods for operationally receiving a work-performing and/or energy delivering attachment. A work platform is powered by a power output device and includes a source of electricity for powering the attachment. The platform has a first end and a second end generally opposite the first end. A first attachment interface is connected to the first end, and a second attachment interface, substantially operationally equivalent to the first attachment interface, is connected to the second end. The first end of the platform also includes a first steering mechanism, and the second end includes a second steering mechanism substantially operationally equivalent to the first steering mechanism, whereby the platform is configured to be propelled and steered in a first direction and propelled and steered in a second direction generally opposite the first direction by the first and second steering mechanisms, respectively.

In another implementation, the mobile platform system and methods described herein for its use include a system comprising a platform powered by at least one power output device (including, without limitation, at least one diesel engine, gasoline engine, electric motor, pump, and/or fluid motor) and at least one energy source (including, without limitation, at least one fuel supply, battery, pressure accumulator, fuel cell, flywheel device, solar cell, or wind energy device). At least one application-specific body portion is carried by the platform, and at least one smart attachment and/or at least one non-compliant legacy attachment connected to at least one of the platform and the body portion. It is to be understood that as used herein, "smart" or "smartness" or lack thereof is defined by the ability to comply with and operate in a set of acceptable rules for communication, control, and reaction accepted by a community of users, regardless of whether those rules are of one or more official standards or of one or more commercial definitions. It is to be further understood that as used herein, a "non-compliant legacy attachment" is one whose lack of "smartness" means a lack of compliance with the aforementioned accepted rules of communication, control, and reaction. The attachment is connected to the energy source and/or the power output device and is configured for performing mechanical work, providing electrical power, providing thermal power, and/or providing fluid power. At least one attachment controller is in communication with the attachment for controlling the operation of the attachment, and at least one remote user input device is in communication with and configured for controlling at least one of the platform and the attachment. A user interface manager is connected to the user input device and to the attachment controller and is configured to automatically provide two-way translation between the user input device and the attachment controller, regardless of whether the attachment is a smart attachment or a non-compliant legacy attachment and without requiring reprogramming of the user input device or the attachment controller, wherein, the user interface manager allows a user to operate the attachment via the user input device.

The mobile work system and methods broadly disclosed herein include in another implementation an optimized electric-drive flexible-platform mobile platform system with center or near-center mounted interconnected electric, electronic, mechanical and hydraulic systems ("CMS") that:

(a) has capability to be operated in either direction as the front or rear of a mobile platform system as vehicle;

(b) has the ability to flexibly connect at any time to off-the-shelf or customized hydraulic, mechanical, and/or electric attachments, and/or an operator's area or cab on either side of the CMS;

(c) can act as a plug-in electric power source either to supply electric power for off-board systems or to run additional off-board electric tools and/or attachments (via connections including, but not limited to, common alternating current (AC) power connections);

(d) can be integrated with an auxiliary power unit ("APU") to provide additional power generation to the mobile platform system (including, without limitation, fluid fuel-based engines, fuel cells, solar panels, compressed air power and other forms of APU) and support for various on-board and off-board attachments;

(e) has integrated batteries and drive systems that are packaged to balance the mobile platform system as a vehicle and which can be augmented with additional batteries on board the mobile platform system to increase stored energy capacity or power transfer capability;

(f) can be operated by operator controls on board, by an off-board driver via remote control, or in a driverless configuration with autonomous controls;

(g) has a software controlled Vehicle Energy System Integrator™ ("VESI™") that:
(i) optimizes the performance of the mobile platform system with respect to the use of the battery and drive systems for motive force, off-board power or use of hydraulics, mechanical systems or other electronics in connection attachments or off-board tools or systems, or can be customized to vary among the foregoing options;
(ii) can recognize through sensors and software or otherwise, the specific attachment or use to which the mobile platform system is being put and can optimize the attachment or use without any required operator input (but can also be customized by the operator); and
(iii) can verify proper mobile platform system component content and component integration for vehicle-to-grid, grid-to-vehicle and vehicle-to-vehicle power transfer.

In another exemplary implementation, an energy and power ecosystem is provided, wherein a mobile power and energy system is built upon a mobile power and energy platform and is an enabling/facilitating component.

An overall "ecosystem" as contemplated by one implementation of the present disclosure, as viewed, in what can be considered and lower-to-higher order of hierarchy, includes the following:

(a) a mobile work system that includes energy storage and power import/export capabilities of flexible composition and that is field-reconfigurable;

(b) a Variable Energy System Integrator™ (VESI™) that ensures/verifies proper composition (i.e., complete and with desired parts or components) of a configuration of a mobile work system for a particular task, such as or including that of an energy and power augmentation component.

(c) a Mobile Energy System Optimizer™ (MESO™) that ensures that what is verified by a mobile work system-level VESI™ is optimal over a window of time for a particular task, such as or including that of an energy and power augmentation component.

(d) a (station-level) VESI™ that ensures/verifies proper composition of a composite power station that includes mobile and or stationary power and energy storage components and for which the mobile components, such as an mobile work system or multiple mobile work systems of various configurations, provide flexibility of configuration.

(e) a (station-level) MESO™ at a composite power station level that ensures that what is verified by a composite station-level VESI™ is optimal for a particular energy/power application over a window of time.

(f) a (network-level) MESO™ at a composite power network level that ensures that what is verified by a composite station-level VESIs are optimal over a window of time and/or concatenation of windows of time across an interconnected network of composite power stations for a particular energy/power application.

(g) a (network-level) MESO™ at a composite power network level that ensures that what composite station compositions are verified by composite station-level VESI™ systems are optimal for a particular energy/power application over a window of time or concatenated windows of time across an interconnected network of composite power stations, which composite power stations include reconfigurable mobile power/energy components (such as mobile work systems) that may move about the network from composite station to composite station (multi-point vehicle-to-grid (V2G) involving multiple vehicles and multiple grid-points).

In another implementation, a mobile work system adapted for operationally receiving at least one attachment configured at a minimum to perform work or to provide an energy output, the mobile work system having a platform powered by a power output device and an energy source operationally connected to the a power output device. The platform includes a first end and a second end generally opposite the first end, a first attachment interface connected to the first end of the platform and adapted for receipt of the attachment, and a second attachment interface connected to the second end of the platform and adapted for receipt of the attachment. The first attachment interface and the second attachment interface are substantially operationally identical to one another. A first steering mechanism is connected to the first end of the platform, and a second steering mechanism is connected to the second end of the platform. The first steering mechanism and the second steering mechanism are substantially operationally equivalent to one another in steering the first end and the second end, respectively. A propulsion arrangement selected from a group consisting of wheels, tracks, rollers, skids, and articulated legs, is connected to the platform, whereby the platform is configured to be propelled by the propulsion arrangement in a first direction leading from, or towards, the first end of the platform and in a second direction leading from, or towards, the second end of the platform and be steered by the first steering mechanism and by the second steering mechanism in a manner generally equivalent to one another.

In certain exemplary implementations the mobile work system includes the power output device being selected from a group consisting of a diesel engine, a gasoline engine, an electric motor, a pump, a fluid motor, and a hybrid power configuration, and wherein the energy source is selected from a group consisting of a fuel supply, a battery, a pressure accumulator, a fuel cell, a fly wheel device, a solar cell, and a wind energy device.

Some implementations further include an application-specific body portion connected to the platform and one or more smart and/or non-compliant legacy attachments, which may be connected to the energy source, and wherein the power output device is configured to perform at least one action of performing mechanical work, providing electrical power, providing thermal power, and providing fluid power.

Implementations include an attachment controller in communication with a smart attachment and/or a non-compliant legacy attachment and be adapted for controlling the operation of the attachment and a user input device in communication with and configured for controlling at least one of the platform and the attachment.

Further implementations include a user interface manager connected to the user input device and to the attachment controller and are configured to automatically provide two-way translation between the user input device and the attachment controller, regardless of whether the attachment is a smart attachment or a non-compliant legacy attachment and without requiring a reprogramming of the user input device or the attachment controller, and further, wherein the user interface manager allows a user to operate the attachment via the user input device.

Additional implementations include a first propulsion arrangement being selected from a group consisting of wheels, tracks, rollers, skids, and articulated legs, connected to the first end of the platform, and a second propulsion arrangement selected from a group consisting of wheels, tracks, rollers, skids, and articulated legs, connected to the second end of the platform.

Other implementations of the present disclosure include the energy source being an electrical energy source and the first attachment interface and the second attachment interface including an electrical connector connected to the energy source, wherein the energy source includes power rails, an electric power system configuration adapted for electric power importing/exporting and/or an electric power take-off.

Implementations also include a fluid power system including at least one of the first attachment interface and the second attachment interface including a fluid power connector connected to the fluid power system, at least one pressure rail and/or a fluid powered power take-off connected to the fluid power system.

Some implementations comprise a thermal management system for, among other things, heating and cooling the energy source.

Other implementations include an open command and communication (CMD/COMM) bus system adapted to control the energy source and/or the power output device, for use in onboard and off-board control of the energy source, the power output device and/or operator controls in wired or wireless communication with the CMD/COMM bus system.

Still further implementations include a user interface manager (UIM) having multiple configurations and adapted to have adaptors for non-standard controls and be in communication with of-board controls or remote mobility controls.

Implementations also include an attachment communications bus having multiple configurations and is adapted to have at least one of the following: adaptors for non-standard attachments; a mobility controller; four wheel drive; four wheel steering; by-wire mobility controls; and by-wireless mobility controls and/or a power management and communications bus having at least one of the following: capability of powering component locations; capability of powering different types of components; adapters for multiple chargers; and adapters for multiple power exporters.

Further implementations include an energy management and communications bus having at least one of the following: capability of interacting with multiple energy locations and types of energy; capability of handling multiple energy components; and an adaptor for multiple energy component controls.

Yet further implementations include a Vehicle Energy System Integrator having at least one of the following: capability of verifying proper content of the mobile work system and capability of conveying proper performance limits for a task performed by the mobile work system or at least one attachment and/or a Mobile Energy System Optimizer having at least one of the following: capability of optimizing content definitions of the mobile work system and the capability of being an onboard or off-board task interpreter.

The mobile platform system of the present disclosure has the ability to recognize and accommodate both smart and legacy attachments and true bi-directionality, having the capability to be configured with either end as front or rear, in addition to being operable with either end as front or rear. The versatile configurability of the present mobile platform system allows location of components on, or connected to, the mobile platform system in locations for optimal usability. The differentiation of the mobile platform system's ability to interface various user attachments and controls, i.e., the mobile platform system has the ability to flexibly connect at virtually any time via electronic communication busses and electric and/or hydraulic power rails to off-the-shelf or customized hydraulic, mechanical, and/or electric attachments or controls, including legacy attachments or controls that may not subscribe to standardized interface requirements, and/or an operator's area or cab on either side of the CMS. The mobile platform system has distinctive connection/connectivity for power, including an electric power bus/rail, instead of a conventional repeated-and-parallel, dedicated source-to-load power/return pairs. Additionally, the mobile platform system includes a distinctive hydraulic power supply "rail" or manifold supplying at-attachment valves, in lieu of centralized valves and repeated source-to-load and load-to-tank pairs.

The VESI™ system mobile platform system to perform a routine self-assessment, each time the mobile platform system is activated to ensure that everything installed on the mobile platform system per a bill of materials (or other build sheet or specifications) are in place and in proper working order. This feature prevents a mobile platform system from operating if it is incomplete, has incorrect parts or components attached, etc. In other words, it allows the mobile platform system to ensure it is in its "correct configuration," such configuration potentially being changeable day to day, or intraday, as different attachments, operational parameters, etc. are used.

The mobile platform system has a near 50/50 weight balance, and as noted in the figures, the operator's cab can be positioned at multiple places on the mobile platform system.

The mobile platform system of the present disclosure operates in true bi-directional fashion, i.e., is "ambidextrous," in contrast to a conventional tractor, which, may move forward and reverse, but is typically biased to operate most efficiently in the forward direction. The mobile platform system is secular and has equal efficiency moving, steering and maneuvering "forward" or "rearward," with it being understood that with the mobile platform system there is actually no inherent "forward" or "rearward" end. The mobile platform system has four-wheel steering which operates through the same range of steering angles and motion on both ends and suspension components to accommodate same. However, when the mobile platform system is manufactured in this configuration, the end user may reconfigure one or both ends to make them differ from one another, such as a rough terrain configuration, where stop blocks may be added to fix an axle, or in certain other configurations, such as when the mobile platform system is used in a forklift configuration.

The features, functions, and advantages that have been discussed can be achieved independently in various examples or may be combined in yet other examples, further details of which can be seen with reference to the following description and drawings.

BRIEF DESCRIPTION OF THE DRAWINGS

Figure 1:
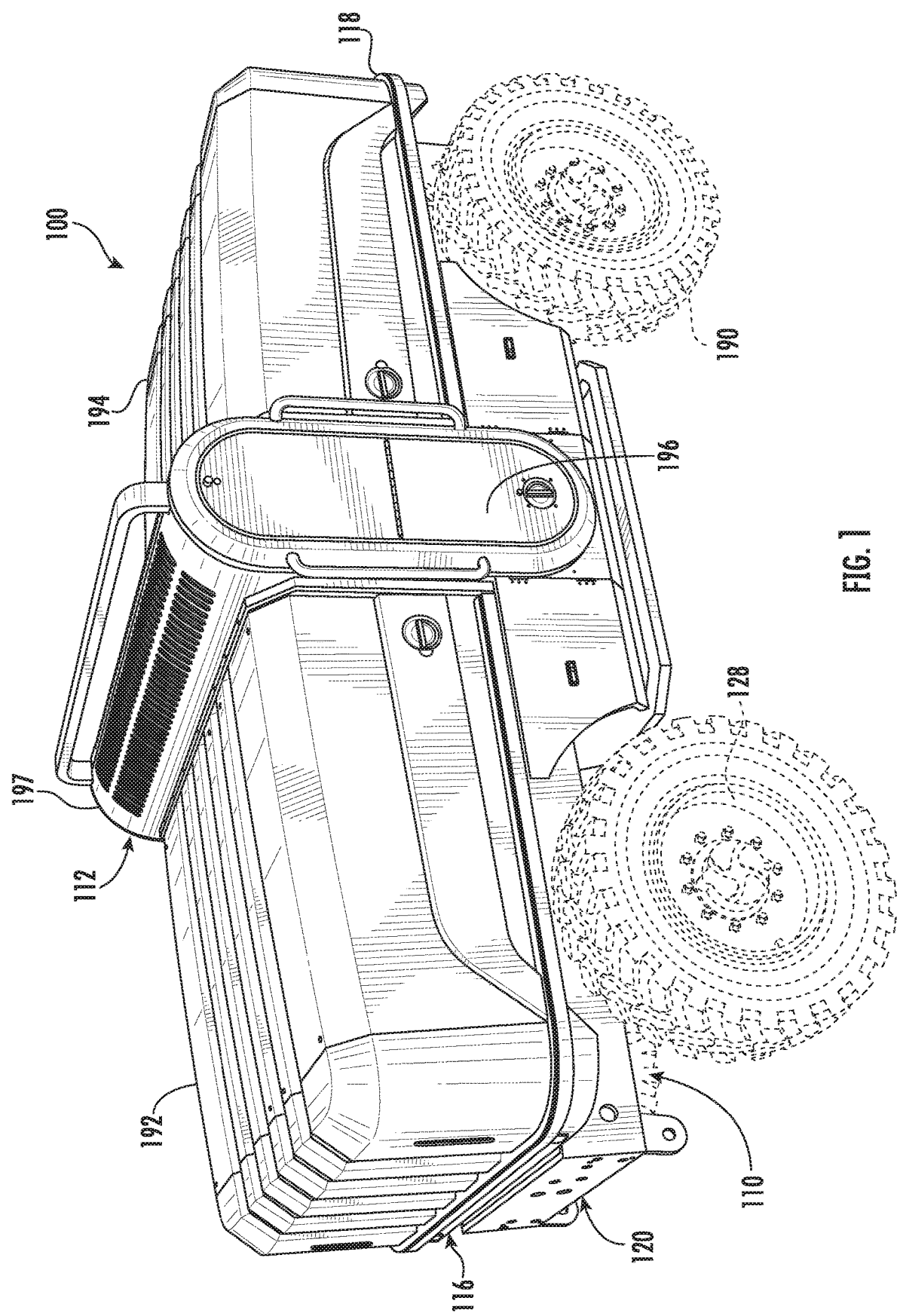
Figure 2:
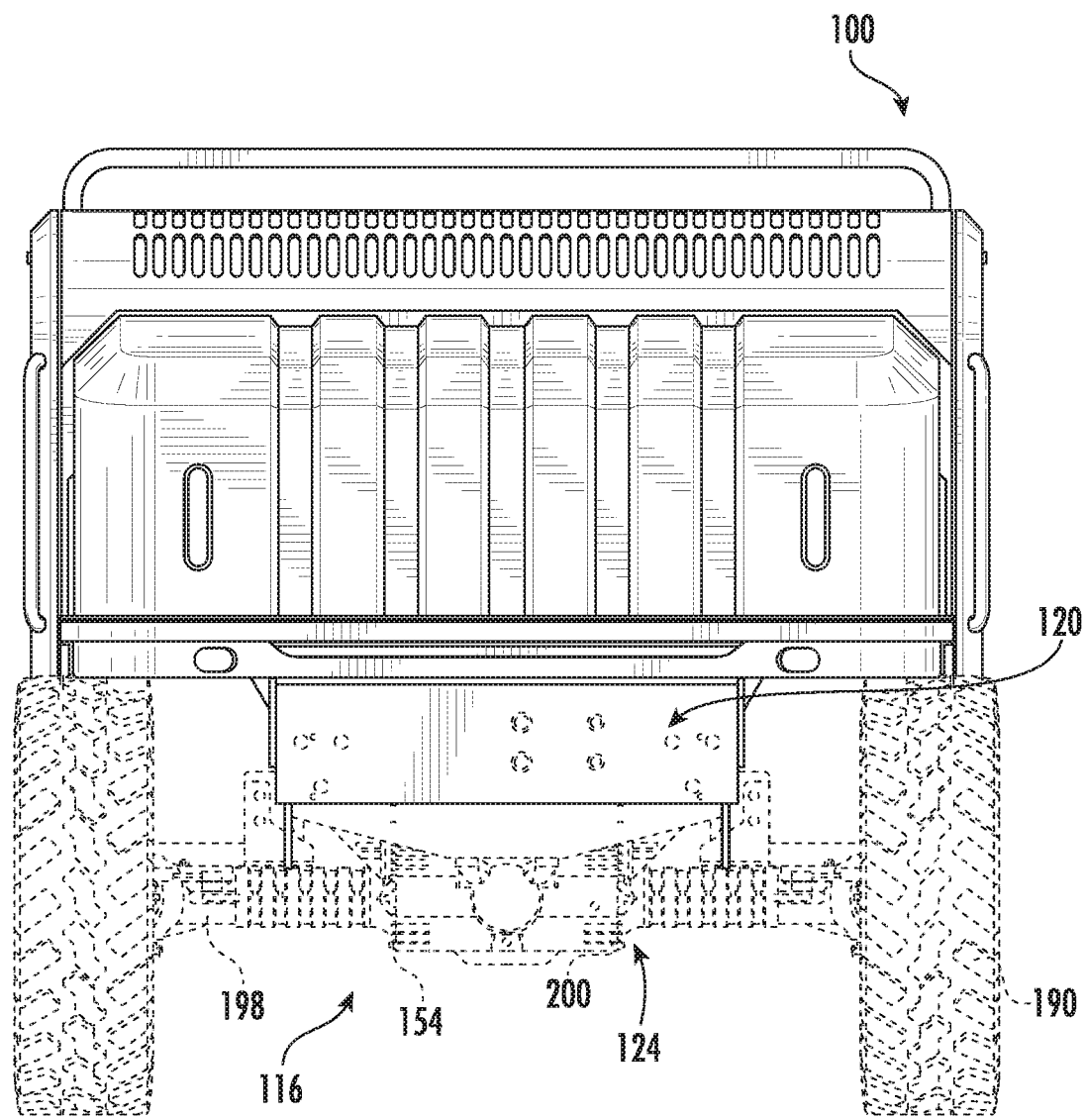
Figure 3:
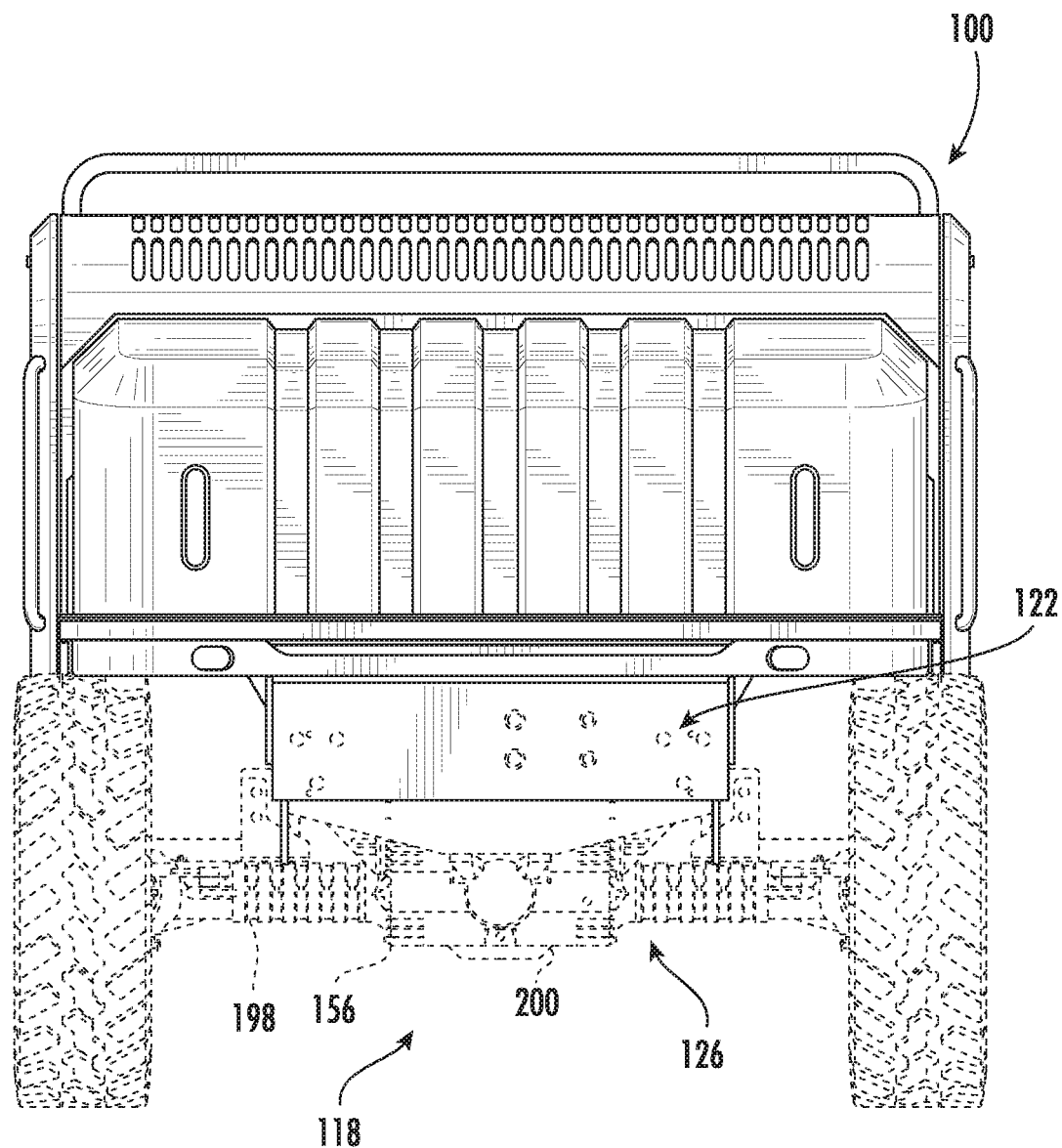
Figure 4:
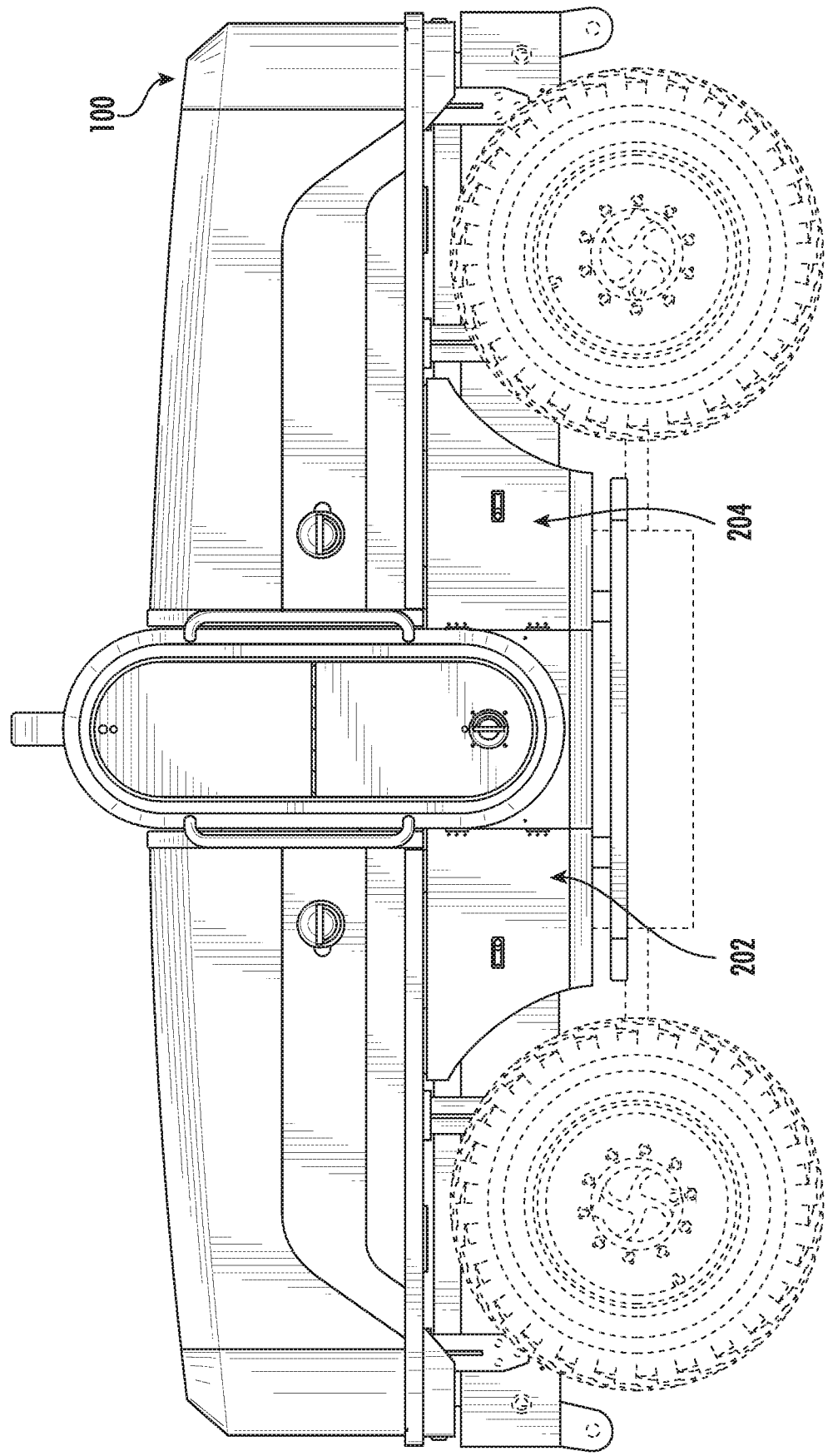
Figure 5:
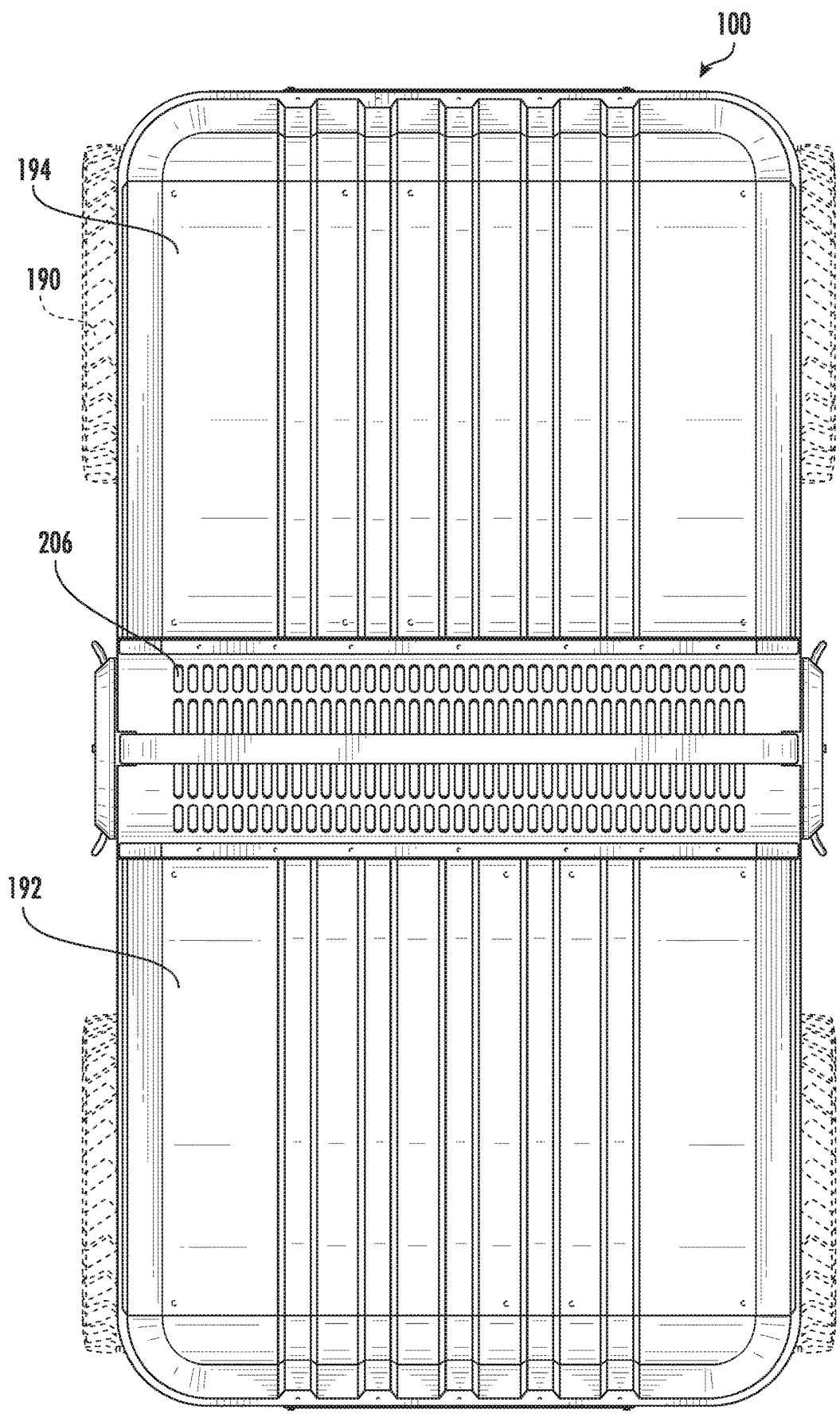
Figure 6:
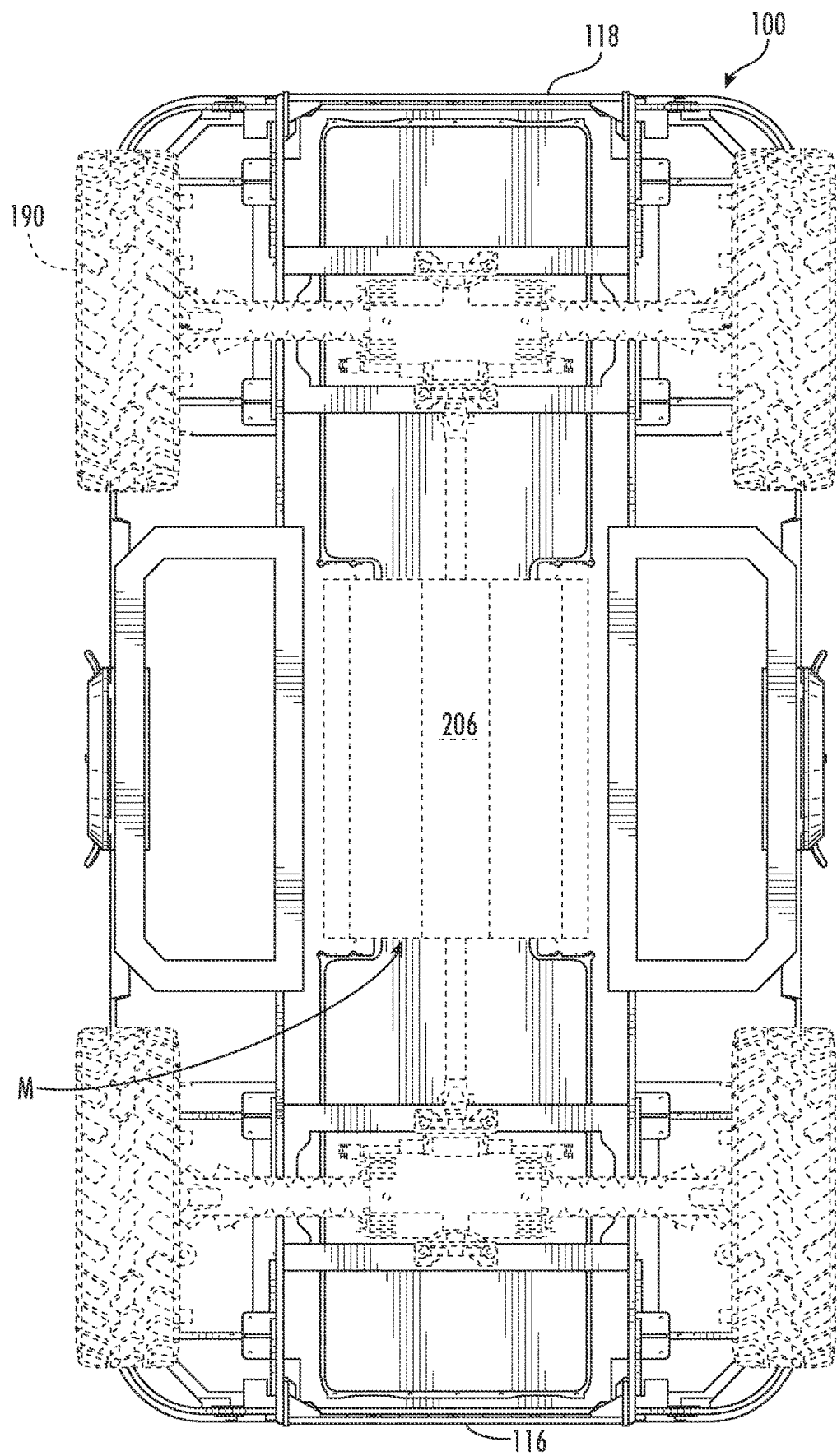
Figure 7:
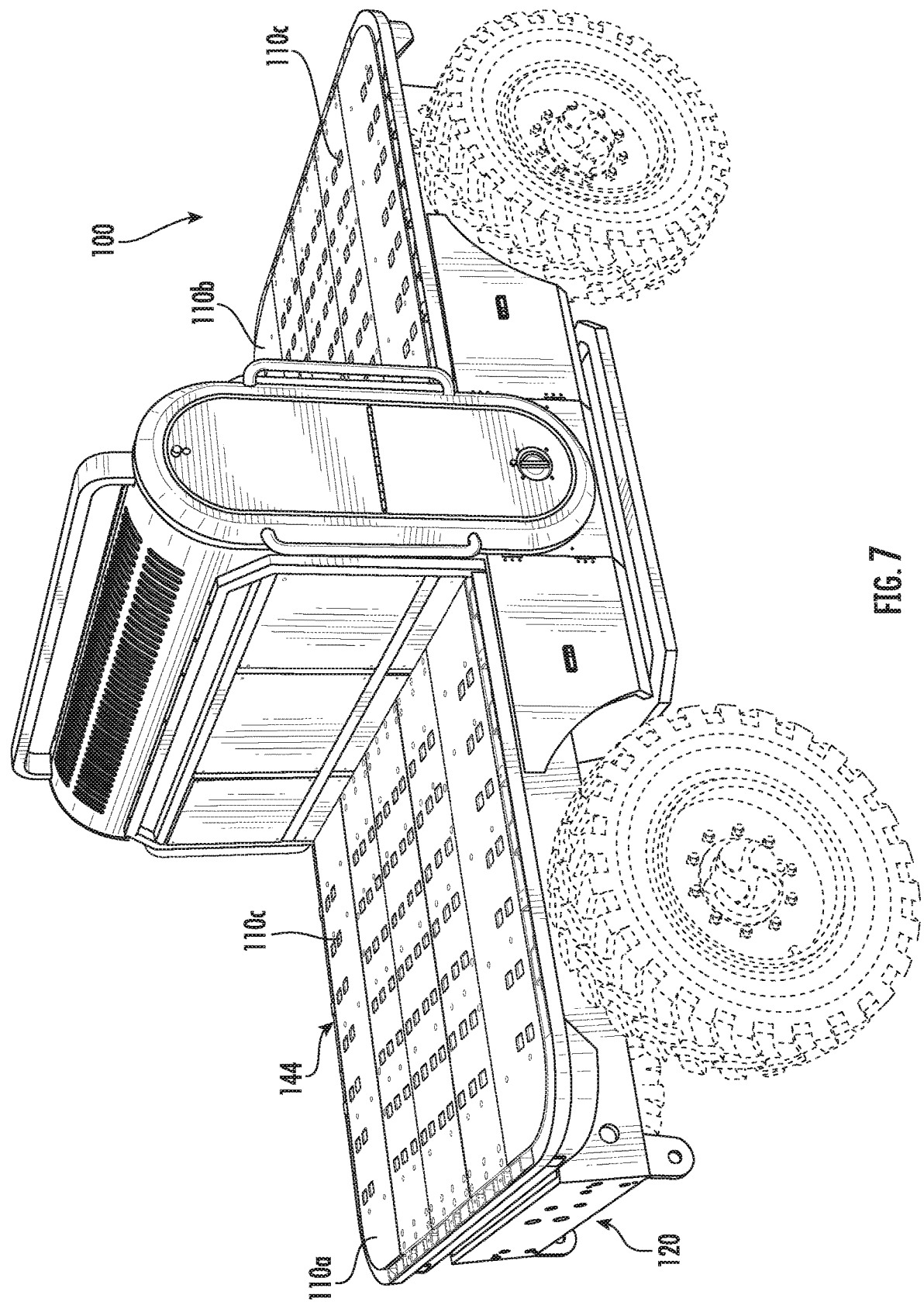
Figure 8:
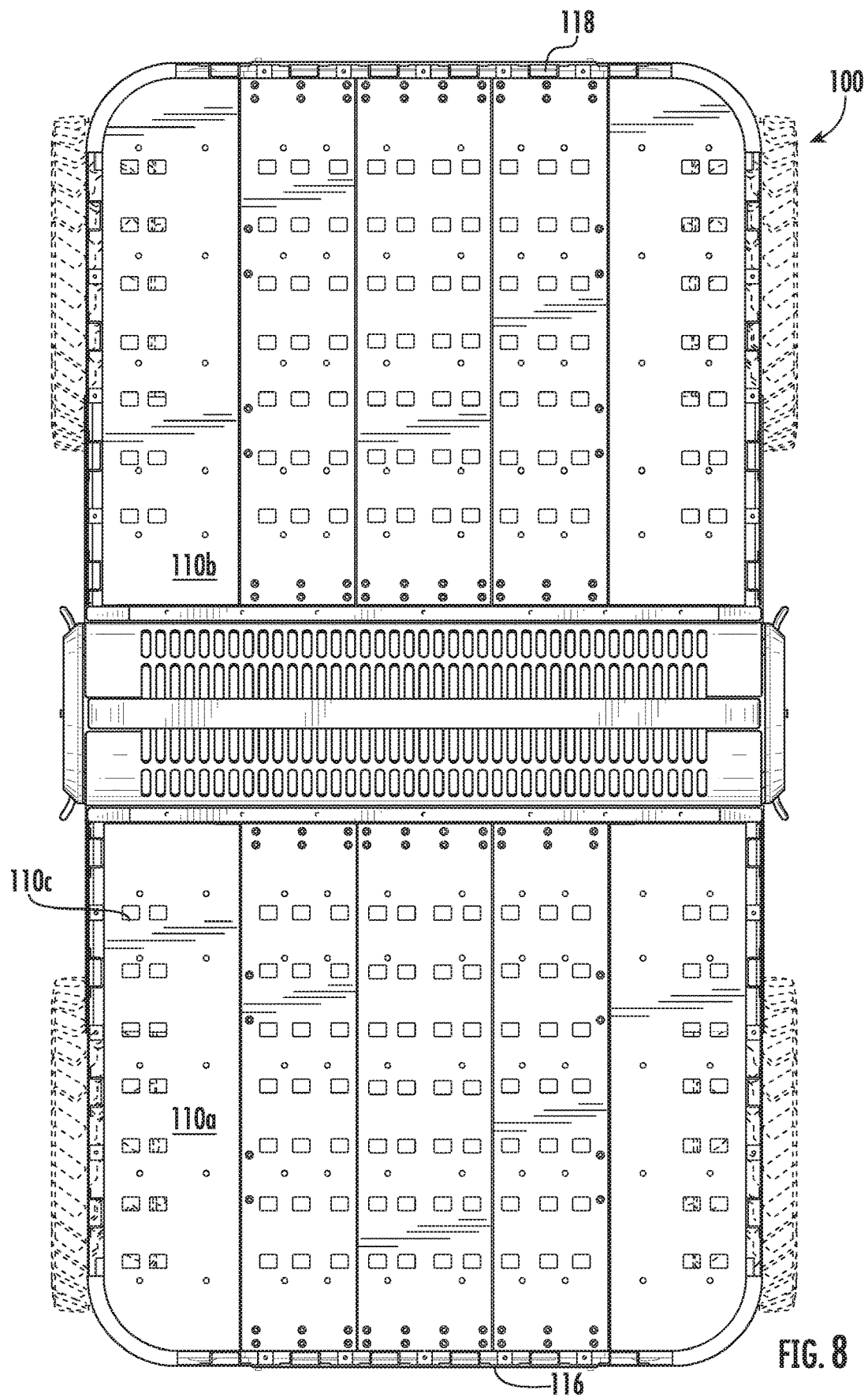
Figure 9:
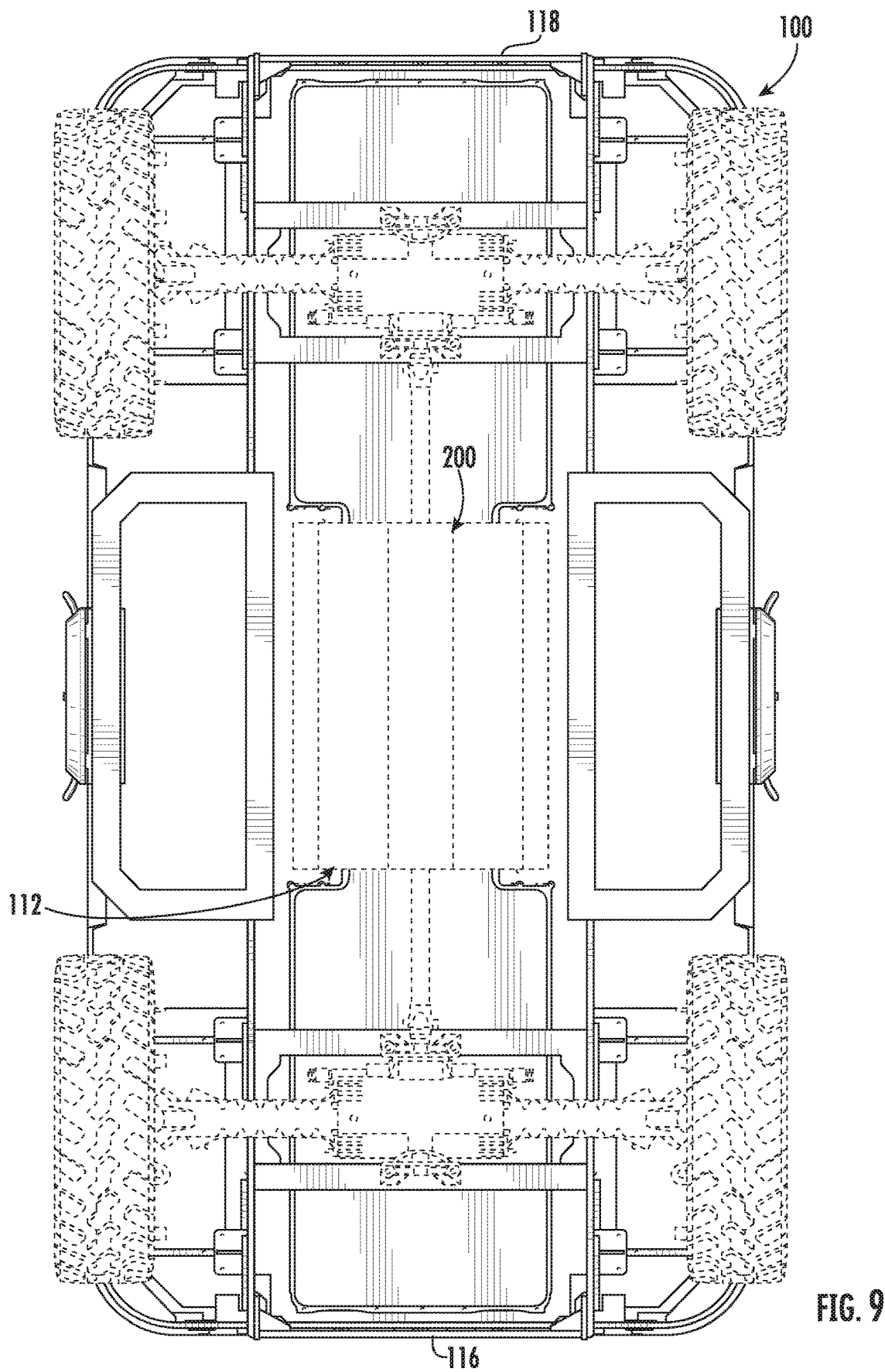
Figure 10:
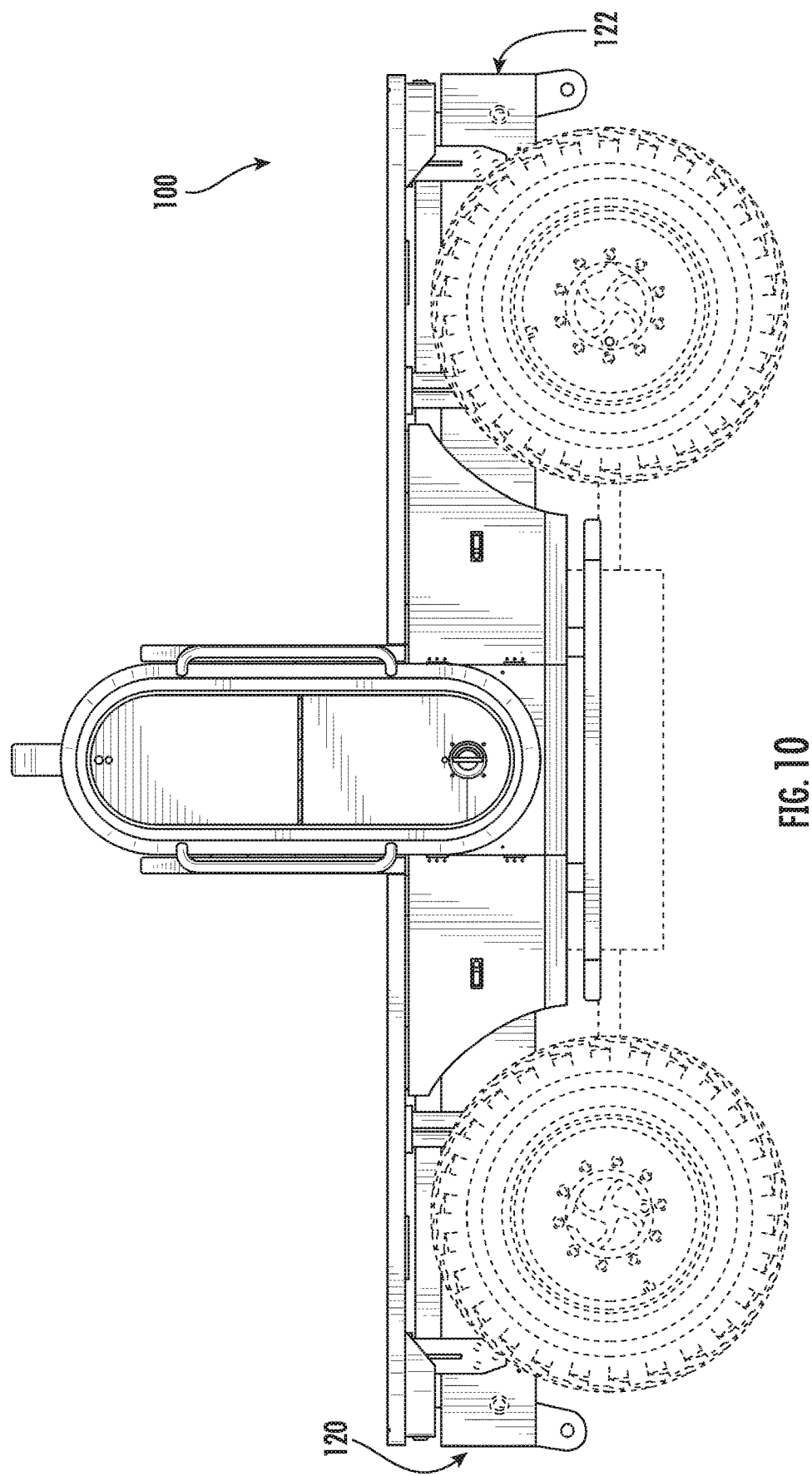
Figure 11:
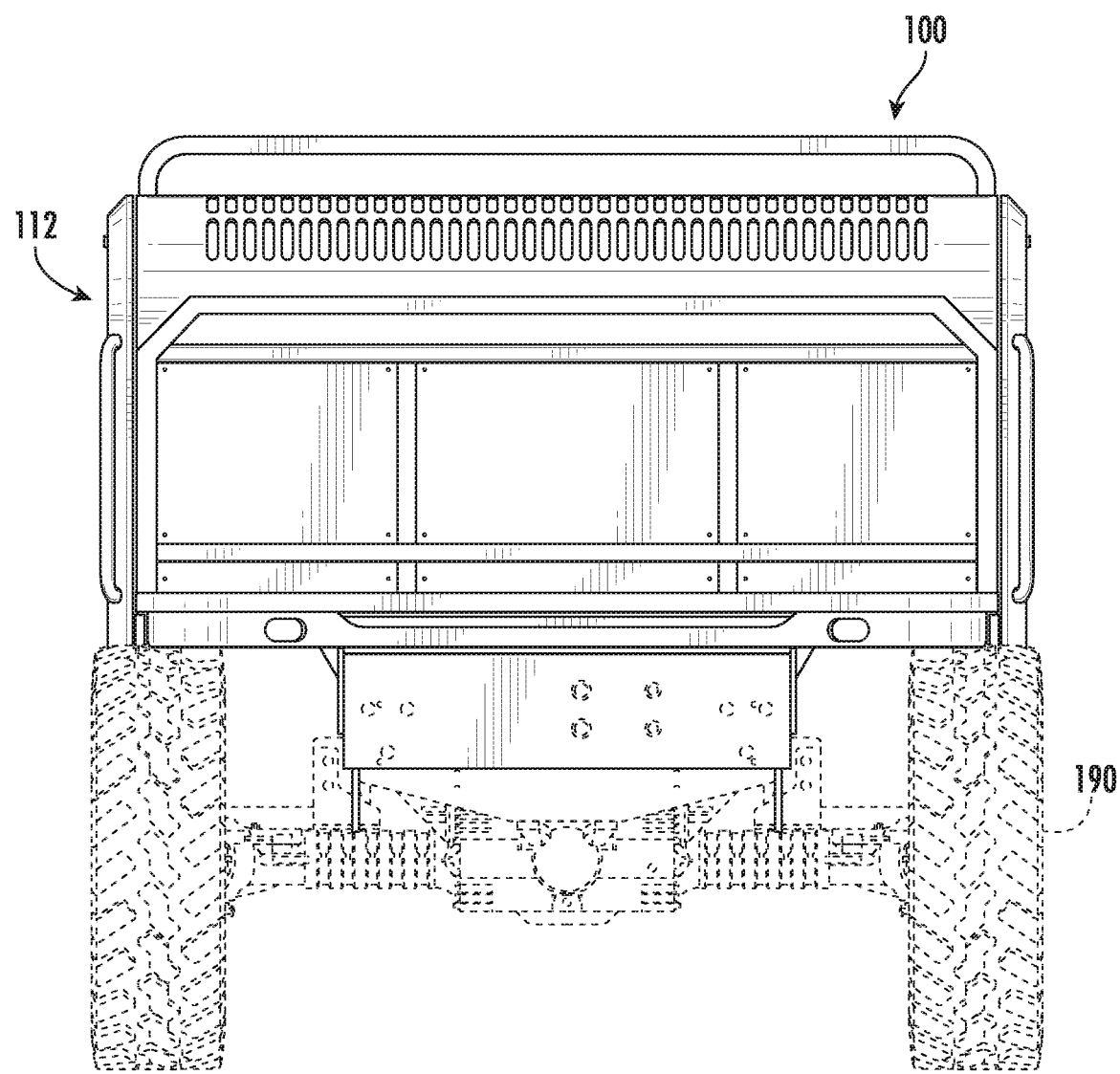
Figure 12:
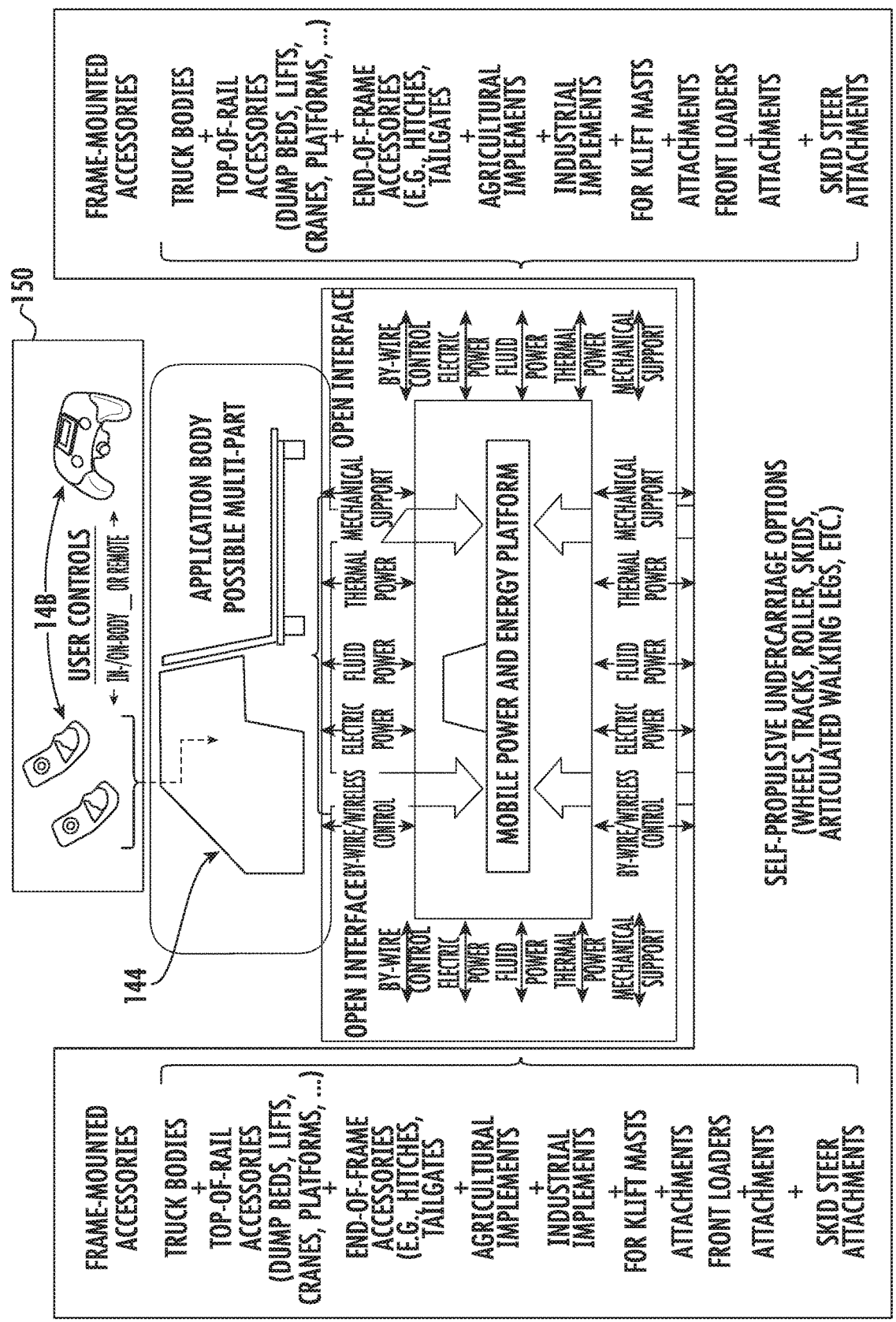
Figure 13:
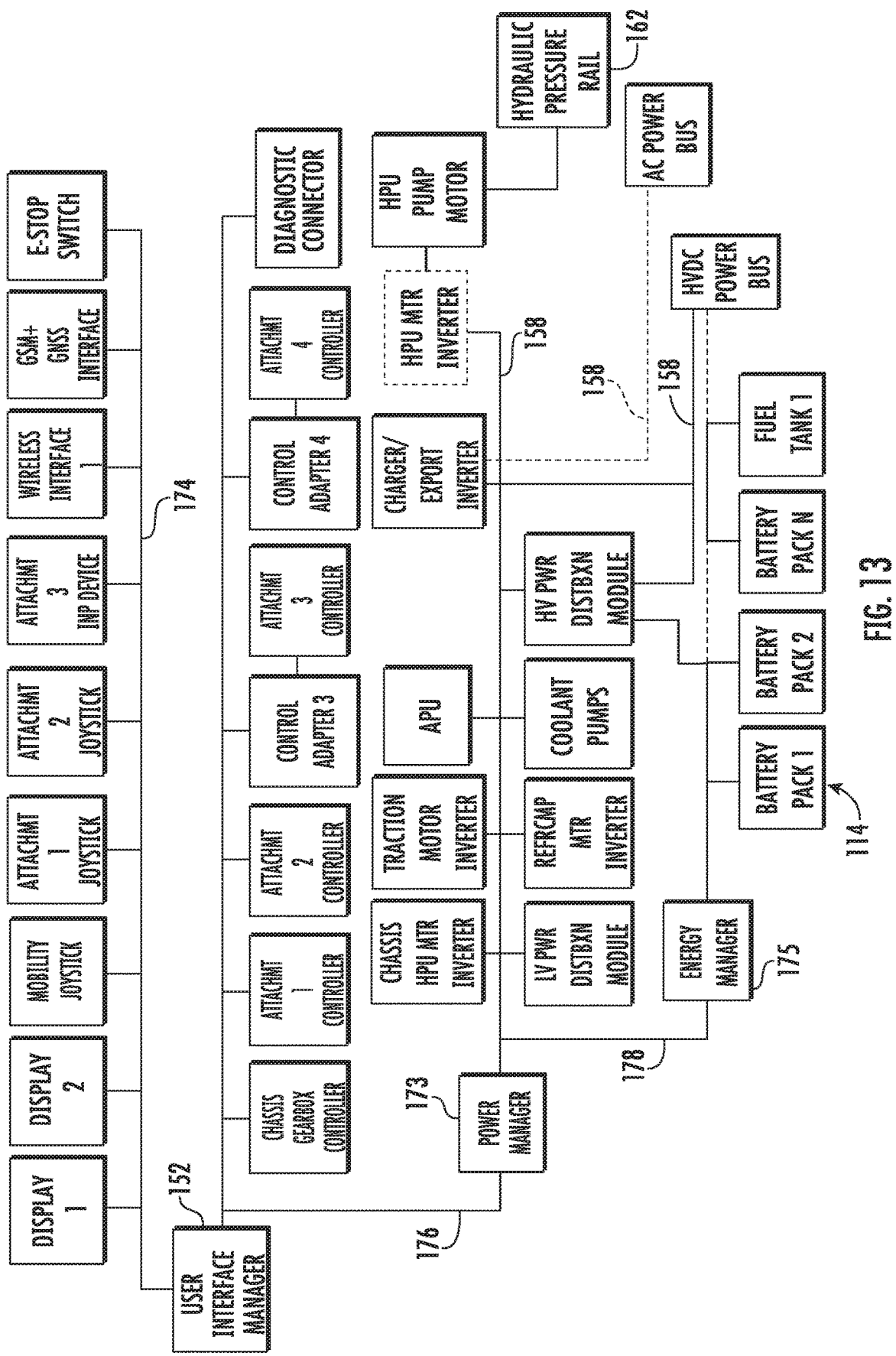
Figure 14:
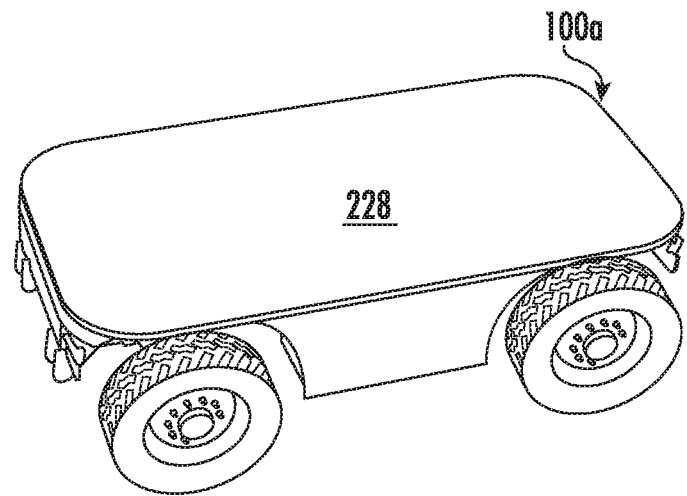
Figure 15:
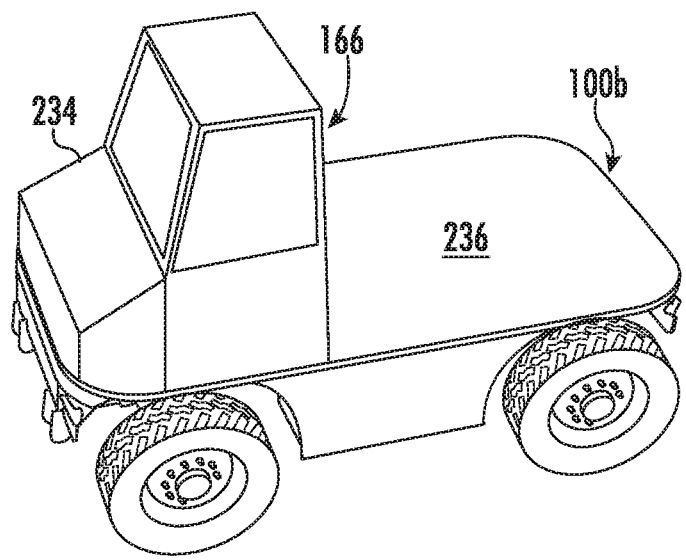
Figure 16:
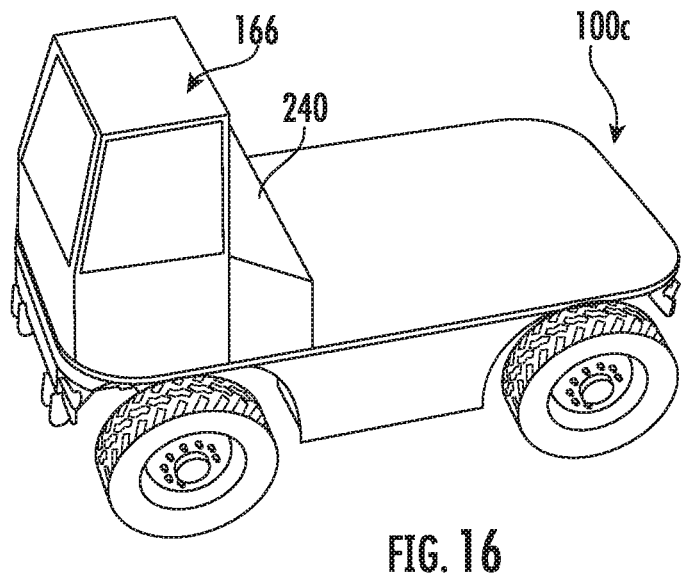
Figure 17:
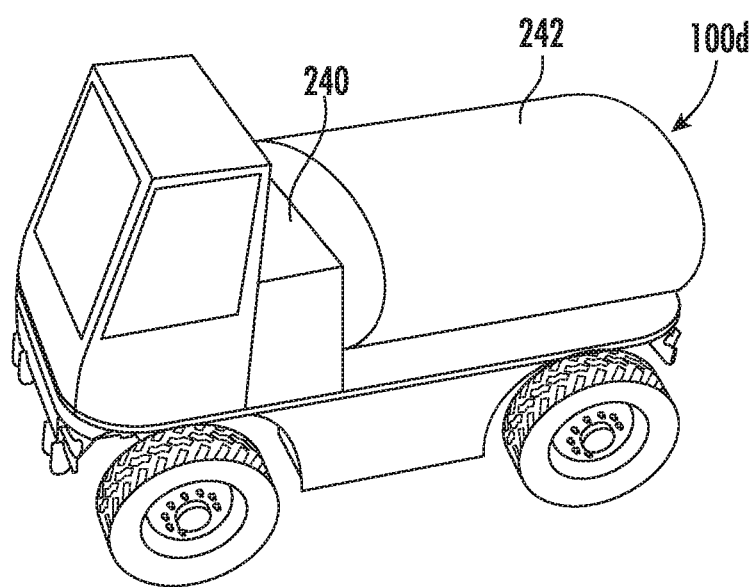
Figure 18:
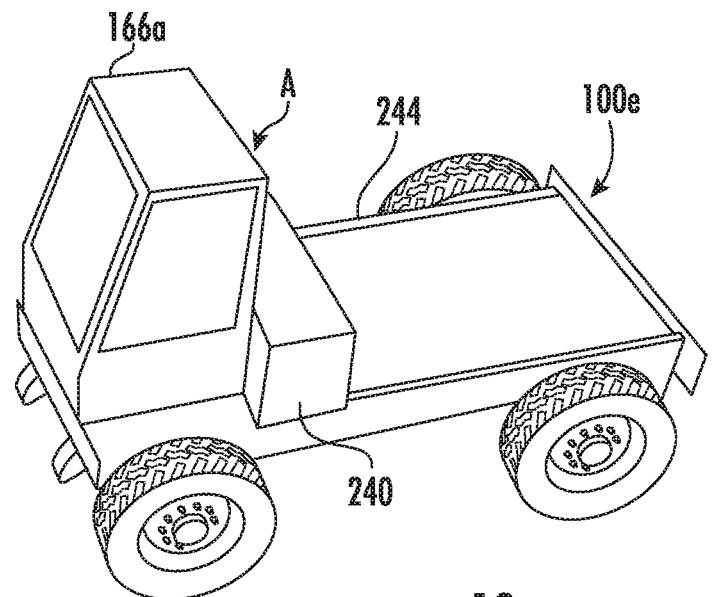
Figure 19:
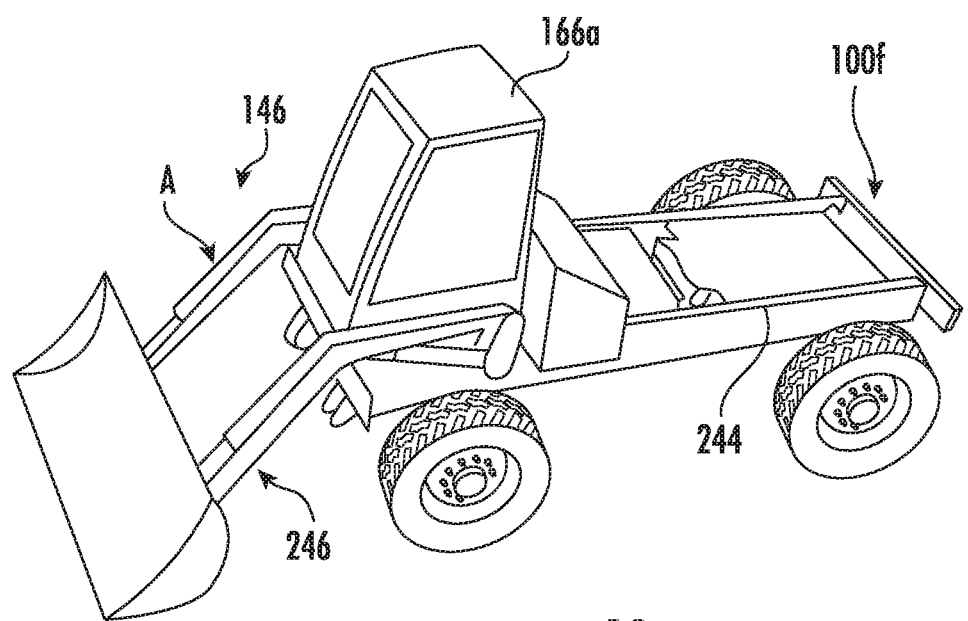
Figure 20:
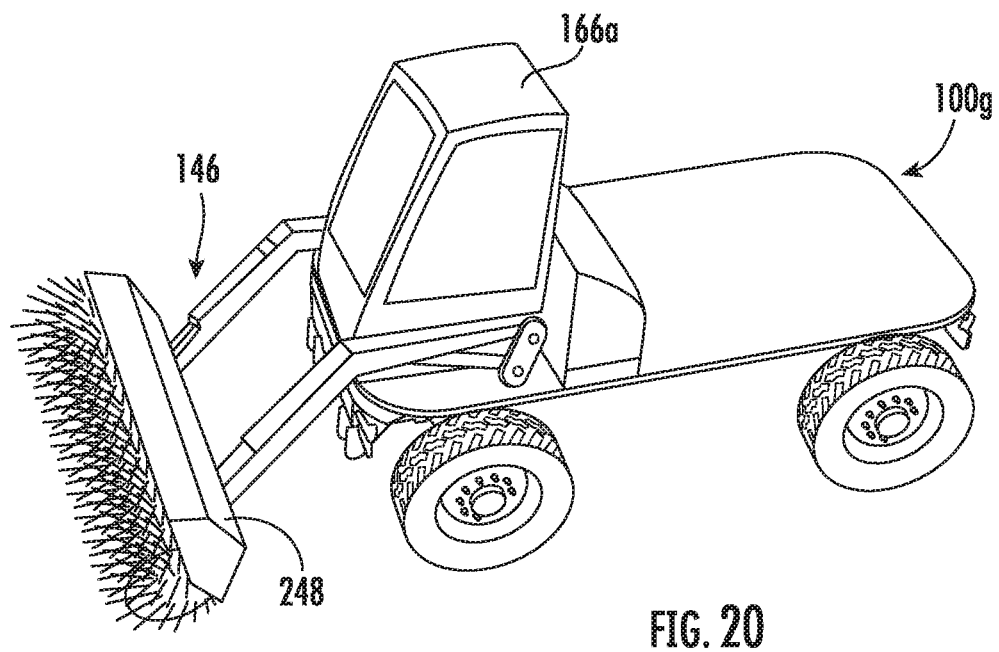
Figure 21:
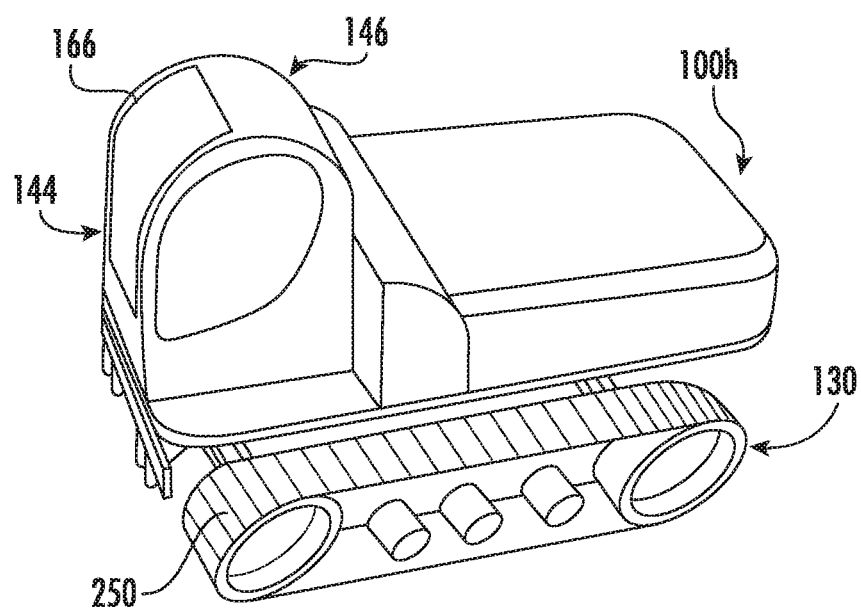
Figure 22:
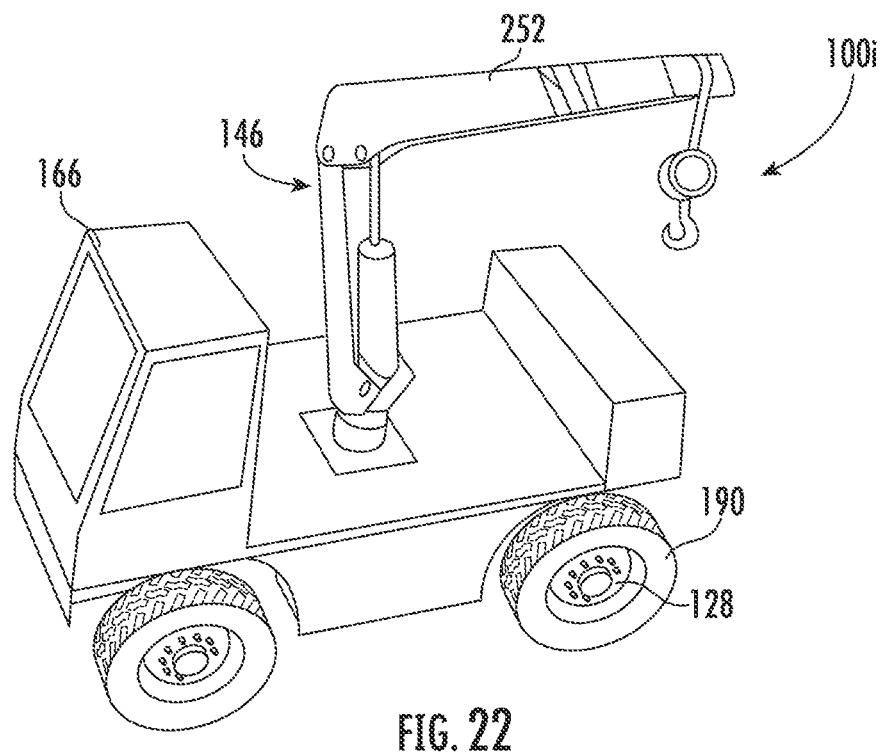
Figure 23:
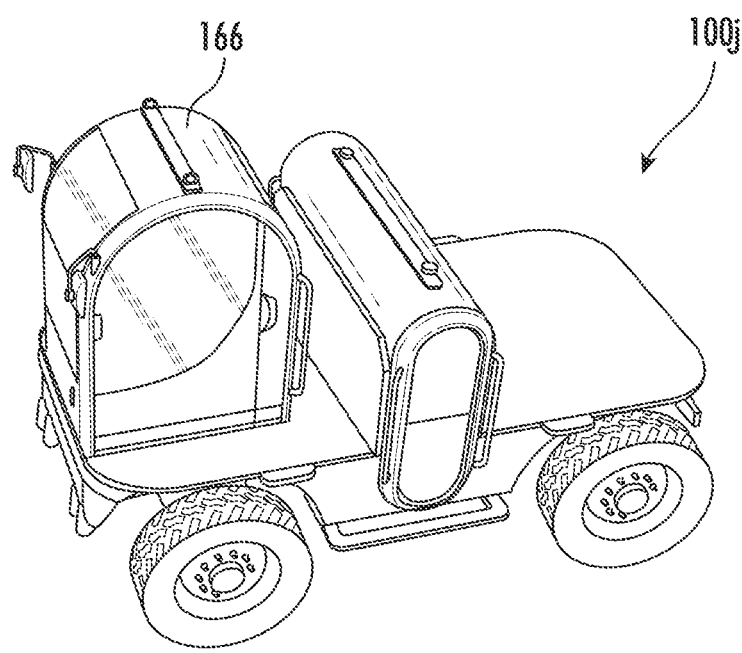
Figure 24:
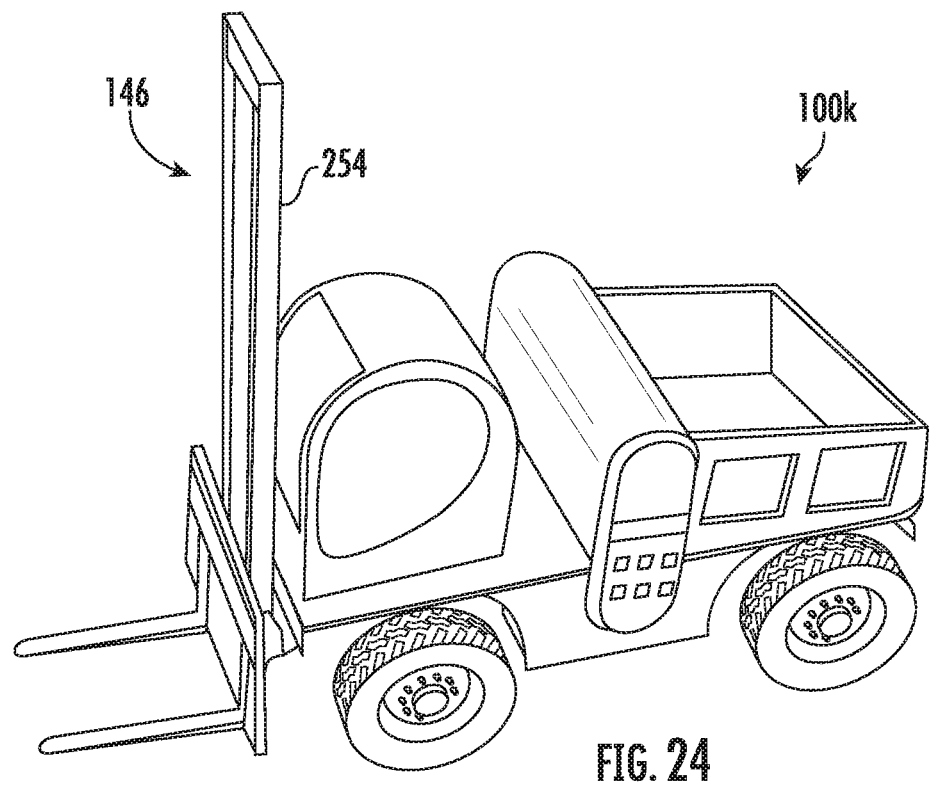
Figure 25:
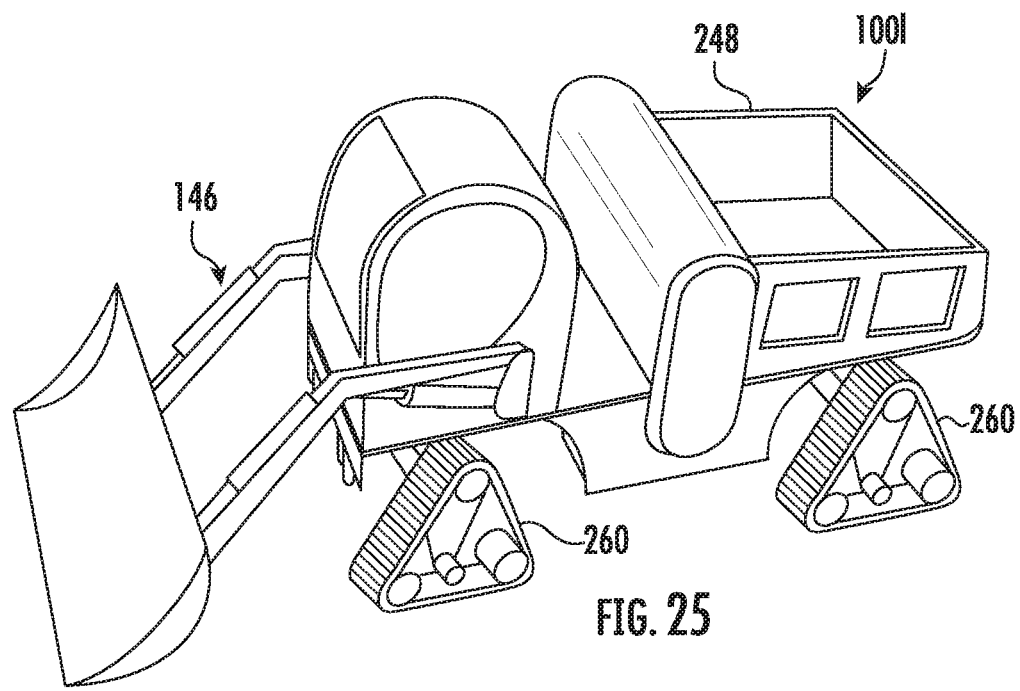
Figure 26:
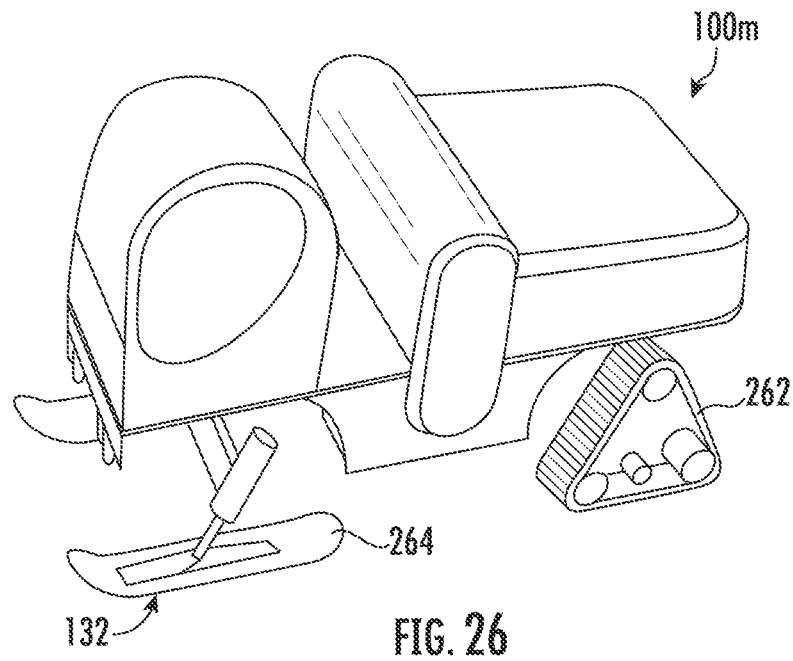
Figure 27:
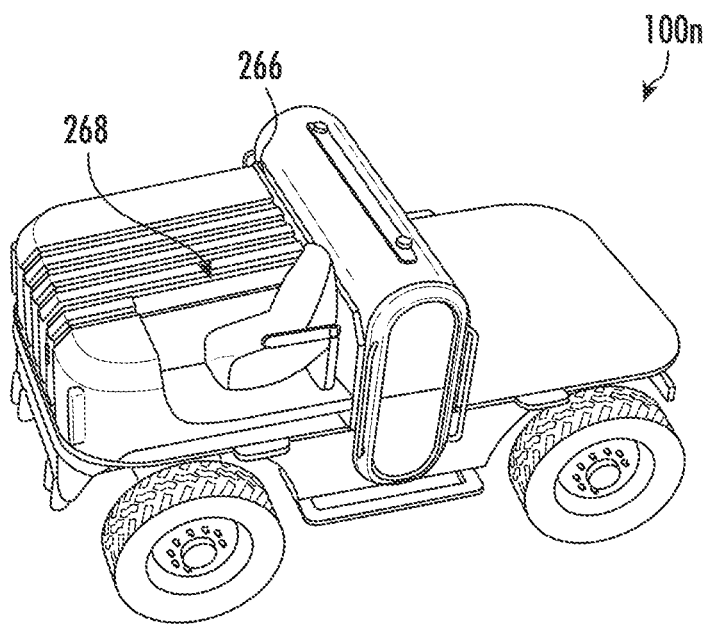
Figure 28:
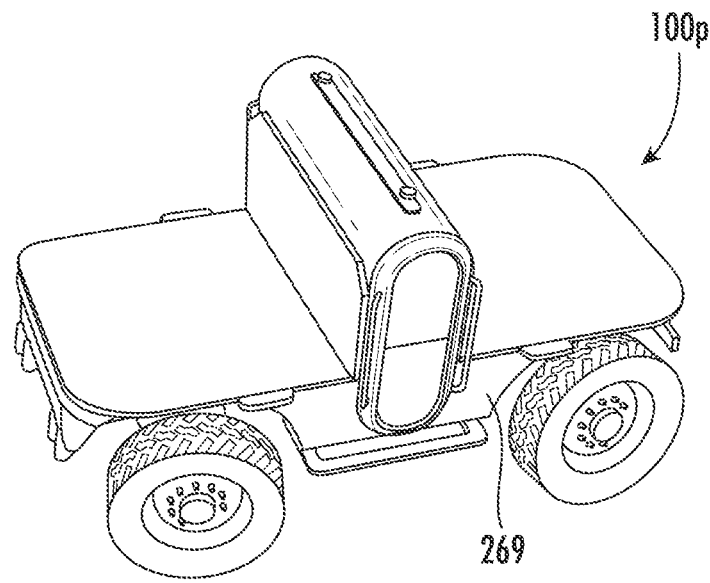
Figure 29:
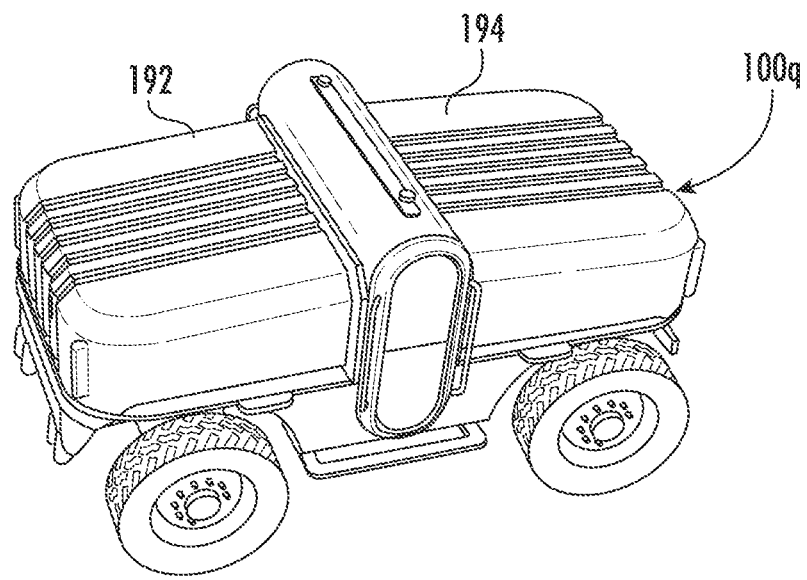
Figure 30:
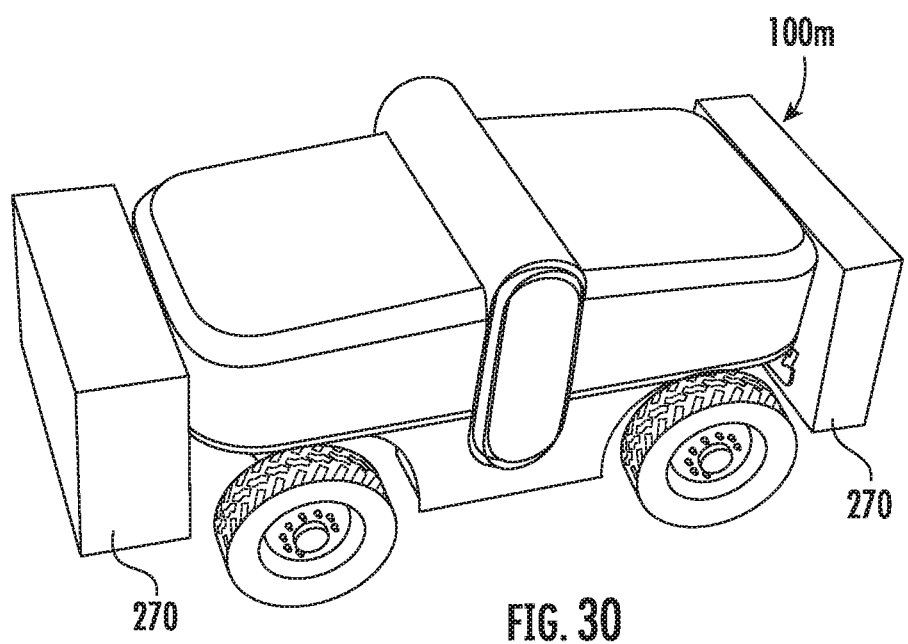
Figure 33:
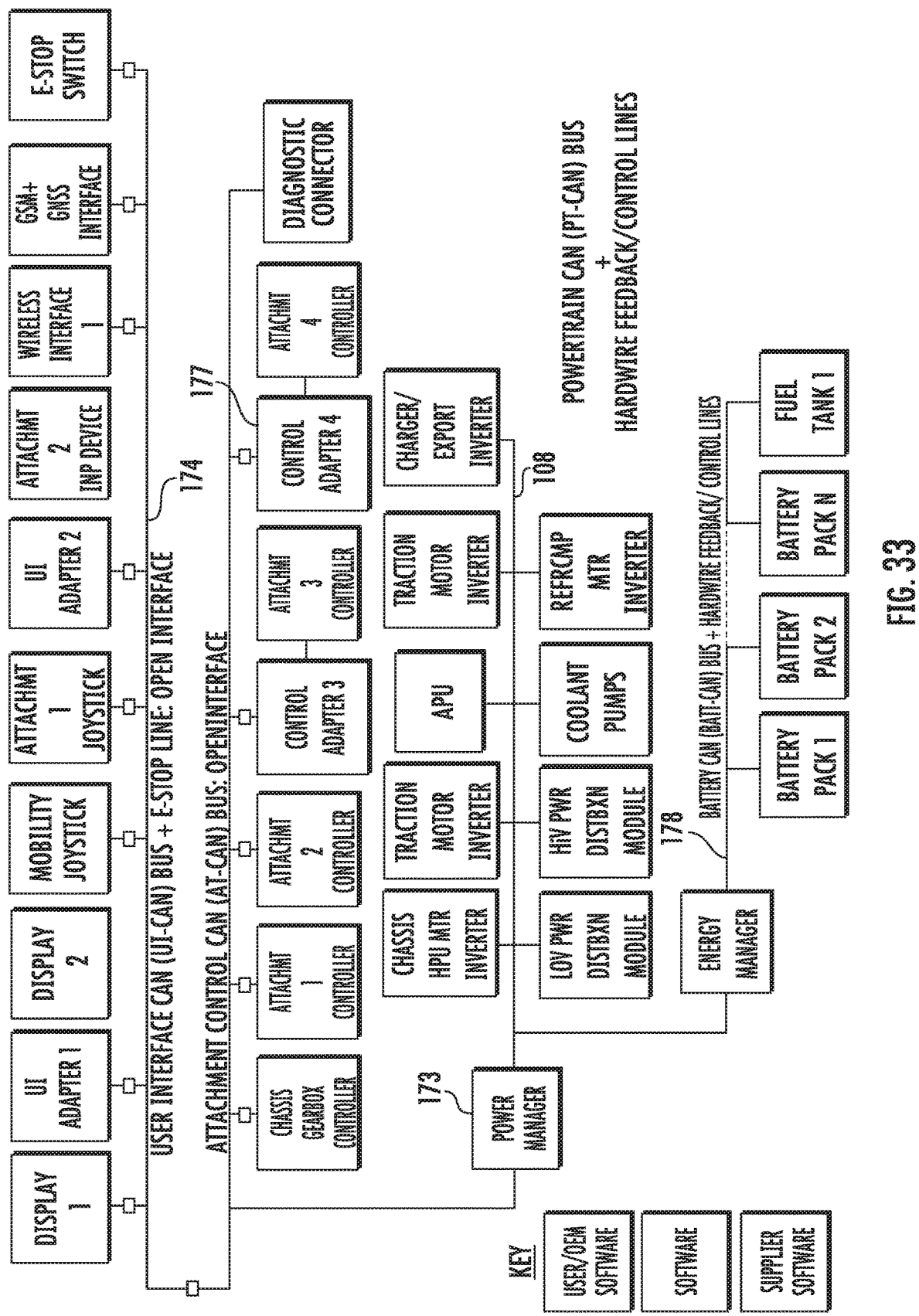
Figure 34:
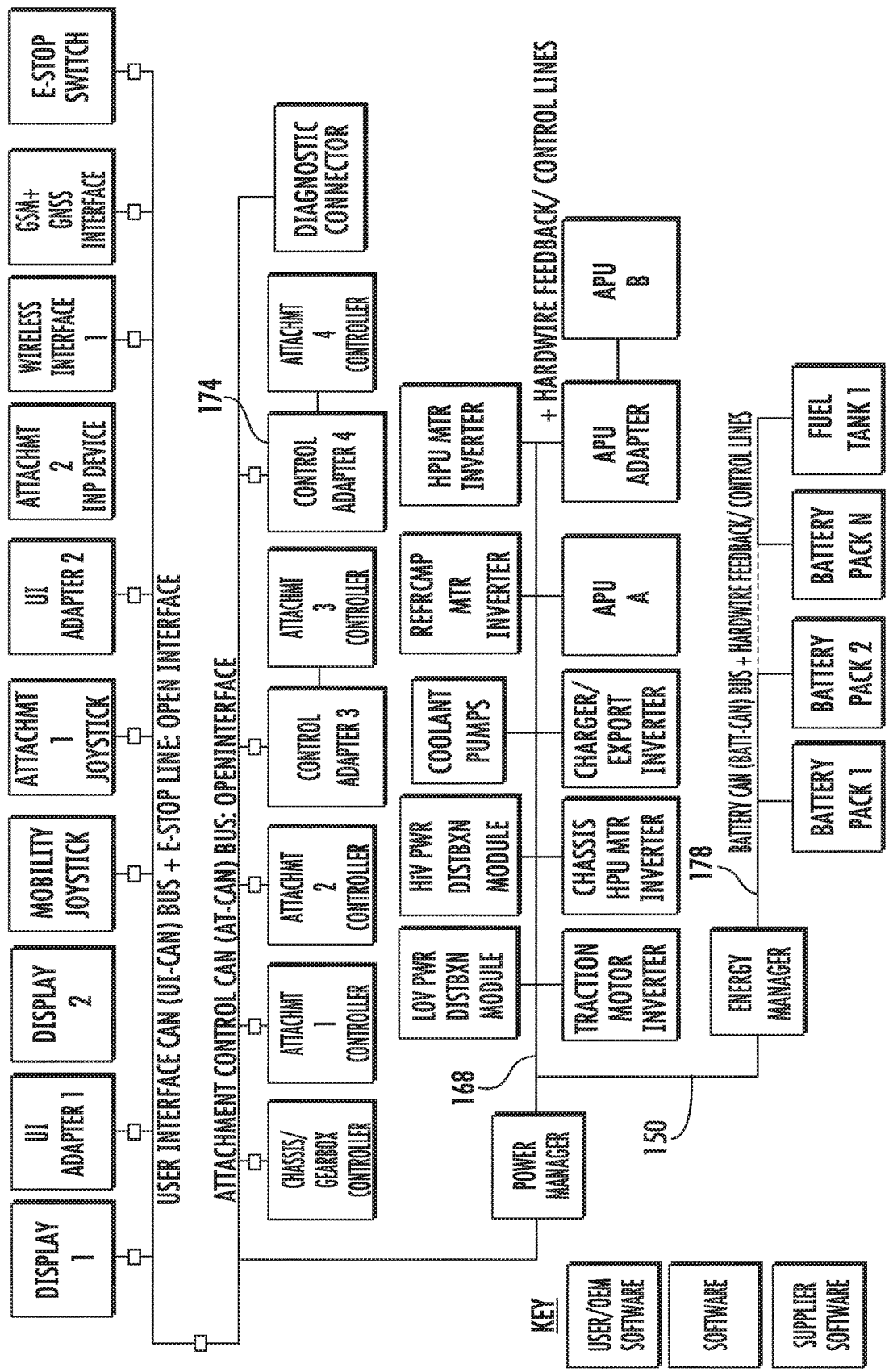

Having thus described exemplary aspects of the disclosure in general terms, various features and attendant advantages of the disclosed concepts will become more fully appreciated as the same becomes better understood when considered in conjunction with the accompanying drawings, which are not necessarily drawn to scale, in which like reference characters designate the same or similar parts throughout the several views, and wherein:

FIG. 1 is a perspective view of an example of one implementation of a mobile platform system of the present disclosure;

FIG. 2 is a first end elevational view of a mobile platform system of FIG. 1;

FIG. 3 is a second end elevational view of a mobile platform system of FIG. 1;

FIG. 4 is a side elevational view of a mobile platform system of FIG. 1;

FIG. 5 is a top plan view of a mobile platform system of FIG. 1;

FIG. 6 is a bottom plan view of a mobile platform system of FIG. 1;

FIG. 7 is a perspective view of another example implementation of a mobile platform system of the present disclosure;

FIG. 8 is a top plan view of a mobile platform system of FIG. 7;

FIG. 9 is a bottom plan view perspective view of a mobile platform system of FIG. 7;

FIG. 10 is a side elevational view of a mobile platform system of FIG. 7;

FIG. 11 is an end elevational view of a mobile platform system of FIG. 7;

FIG. 12 is a schematic representation of an example implementation of a mobile platform system of the present disclosure;

FIG. 13 is a schematic view of a subsystem of an example implementation mobile platform system of the present disclosure depicting namely, an open interface layer, a platform integration software layer, and a supplier-particular component interface layer;

FIG. 14 is a schematic representation of another example implementation of a mobile platform system of the present disclosure, having a flatbed upper surface and cooling and power electronics in side-located compartments;

FIG. 15 is a schematic representation of another example implementation of a mobile platform system of the present disclosure, having a cooling system and a power system in a compartment adjacent an operator cab, the operator cab being adjacent a platform bed;

FIG. 16 is a schematic representation of another example implementation of a mobile platform system of the present disclosure, having a cab at an extreme end, and a cooling system, electronic system carried in a compartment adjacent the cab, and a platform bed adjacent the compartment;

FIG. 17 is a schematic representation of another example implementation of a mobile platform system of the present disclosure, having a cab at its extreme end, a cooling system and electronic system compartment adjacent a cab, and a tank or other container on a platform bed adjacent the compartment;

FIG. 18 is a schematic representation of another example implementation of a mobile platform system of the present disclosure, having a narrowed cab, with a cooling system and/or electronics system compartment adjacent the cab, and open chassis rails or platform adjacent the compartment;

FIG. 19 is a schematic representation of another example implementation of a mobile platform system of the present disclosure, having a bucket and/or loader at one extreme end of the platform system, with a narrowed cab between arms of such bucket/loader, with a cooling system/electronic system compartment adjacent the cab, and open chassis rails adjacent the compartment, it being understood that this implementation can be equipped to carry accessories with SAE J2513 skid steer accessory interfaces;

FIG. 20 is a schematic representation of another example implementation of a mobile platform system of the present disclosure, with a boom and/or front loader, with arms extending to either side of a narrow cab, a cooling system/electronic system compartment adjacent the cab, and a platform bed adjacent the cab, it being understood that this implementation is equipped to carry accessories with SAE J2513 skid steer accessory interfaces, as can be provided to other implementations discussed above and otherwise disclosed herein;

FIG. 21 is a schematic representation of another example implementation of a mobile platform system of the present disclosure, with a narrowed cab at one extreme end of the platform system, a cooling system/electronic system compartment adjacent the narrowed cab, and a long bed with a cover adjacent the compartment, and tracks carrying the platform for mobility;

FIG. 22 is a schematic representation of another example implementation of a mobile platform system of the present disclosure, with a cab at one extreme end, a crane midway-mounted on a platform bed, and a cooling system/electronics system compartment at the other extreme end of the platform;

FIG. 23 is a schematic representation of another example implementation of a mobile platform system of the present disclosure, with a cab on one extreme end of a platform, a mid-mounted cooling system/electronic system compartment, and a platform bed adjacent such compartment;

FIG. 24 is a schematic representation of another example implementation of a mobile platform system of the present disclosure, having a lift mast at one extreme end of the platform, a cab on the platform adjacent the lift mast, a mid-mounted cooling system/electronics system compartment, and a dump bed adjacent such compartment;

FIG. 25 is a schematic representation of another example implementation of a mobile platform system of the present disclosure, having a bucket loader on one extreme end of the platform system with a narrowed cab between articulated arms of such bucket loader, a cooling system/electronics system compartment adjacent the cab; and a dump bed adjacent the compartment, the platform being carried on quad tracks;

FIG. 26 is a schematic representation of another example implementation of a mobile platform system of the present disclosure, having a narrowed cab on one extreme end of the platform, a cooling system/electronics system compartment positioned between the cab and a bed with a cover, the platform being carried on halftracks at one end thereof and skis or skids at the other end thereof;

FIG. 27 is a schematic representation of another example implementation of a mobile platform system of the present disclosure, with an auxiliary power unit and operating station, a mid-mounted cooling system/electronics system compartment, and a platform bed adjacent such compartment;

FIG. 28 is a schematic representation of another example implementation of a mobile platform system of the present disclosure, with a platform bed adjacent one extreme end and another platform bed adjacent the other extreme end, with a mid-mounted cooling system/electronics system compartment between such platform beds;

FIG. 29 is a schematic representation of another example implementation of a mobile platform system of the present disclosure, with a mid-mounted cooling system/electronics system compartment, covered platform bed portions, one being adjacent each end of the platform, such mobile platform system being remote controlled;

FIG. 30 is a schematic representation of another example implementation of a mobile platform system of the present disclosure, with a platform having a mid-mounted cooling system/electronics system compartment, a covered platform bed adjacent each end of the platform, and an accessory compartment extending beyond the extreme end of each end of the platform, such accessory cabinets containing maximum power point tracking (MPPT) electronics, fast charged electric vehicle supply equipment (EVSE), and other equipment for use in connection battery buffing of one or more photovoltaic and/or wind charging stations;

FIG. 31 is a schematic representation of another example implementation of a mobile platform system of the present disclosure, showing vehicle-level systems in the far left column, each in its own row, and subsystems/variations which can be combined individually or collectively for a given system are shown to the right in each such row;

FIG. 32 is a schematic representation of another example implementation of a mobile platform system of the present disclosure, showing system-level systems in the far left column, each in its own row, and subsystems/variations which can be combined individually or collectively for a given system are shown to the right in each such row;

FIG. 33 is a schematic view of a subsystem of an example implementation mobile platform system of the present disclosure depicting distributed user interface management through use of per-input/per-controller adapters; and FIG. 34 is a schematic view of a subsystem of an example implementation mobile platform system of the present disclosure depicting a generic architecture reflecting flexibility with respect to user input devices, attachment controllers, power sources, and energy storage devices.

DETAILED DESCRIPTION

Examples of the present disclosure will now be described more fully hereinafter with reference to the accompanying drawings, in which some, but not all examples of the disclosure are shown. Indeed, various exemplary aspects of the disclosure may be embodied in many different forms and should not be construed as limited to the examples set forth herein. Rather, these examples are provided so that this disclosure will be thorough and complete and will fully convey the scope of the disclosure to those skilled in the art. Like reference numerals refer to like elements throughout.

Referring now to FIGS. 1-6, one implementation of a mobile platform system, generally 100, of the present disclosure is illustrated. In this particular implementation, mobile platform system 100 is shown with covers enclosing upper portions of mobile platform system 100. In another configuration as shown in FIGS. 7-11, covers are not present. FIGS. 14-30 illustrate various other implementations of mobile platform system 100. However, it is to be understood that even with the numerous variations of mobile platform system 100 disclosed herein, such variations are for example purposes only and are not to be construed as limiting the scope of the present disclosure, since the mobile platform system 100 could take on many other configurations not depicted herein, but still within the scope of the present disclosure.

Turning to FIG. 1, one implementation of a mobile work system 100 adapted for operationally receiving at least one attachment is shown. Mobile work system 100 includes a platform, generally 110, which may or may not include a structural support frame, powered by at least one power output device, generally 112 (FIG. 12). At least one energy source, generally 114, is operationally connected to power output device 112.

Platform 110 defines a first end 116 and a second end 118 generally opposite first end 116. A first attachment interface, generally 120, is connected to first end 116 of platform 110 and is adapted for receipt of at least one attachment, generally A (FIG. 19, for example). A second attachment interface 122 is connected to second end 118 of platform 110 and is also adapted for receipt of attachment A. First attachment interface 120 and second attachment interface 122 are each substantially operationally identical to one another, i.e., in a sense, "ambidextrous" or "secular,' in that an attachment A can be attached to interface 120 or interface 122 with no significant difference between attachment to either of such interfaces 120, 122. As discussed above, this omni-attachment capability of mobile work system 100 renders system 100 extremely versatile, in that there is no "front" or "rear" end of system 100.

Each end 116, 118 of system 100 includes a steering mechanism, and each such steering system is virtually identical to the another, in that each steering mechanism may be turned through the substantially same range of motion, or arc, as compared to one another, and are otherwise maneuverable in the same fashion and to the same extent. More specifically, first end 116 of system 100 includes a first steering mechanism 124 connected to the first end of platform 110 and a second steering mechanism 126 connected to second end 118 of platform 110. At least one propulsion arrangement, generally M (FIG. 6), is provided system 100 and attached to platform 110. Propulsion arrangement M could be any of a variety of modes or configurations, such as wheels, generally 128, tracks, generally 130 (FIG. 21), skids, generally 132 (FIG. 26), rollers (not shown), articulated walking legs (not shown), and/or combinations of the foregoing, etc. (FIG. 12).

Accordingly, given the foregoing construction of the above implementation of mobile work system 100, platform 110 may be propelled by propulsion arrangement M in a first direction towards first end 116 of platform 110 and/or in a second direction towards second end 118 of platform 110 and may be steered by first steering mechanism 124 and by second steering mechanism 116 in a manner generally equivalent to one another.

As shown in FIG. 12, mobile work system 100 includes at least one power output device 114 selected from a group including a diesel engine, a gasoline engine, an electric motor, a pump, a fluid motor, and/or a hybrid powered configuration. Additionally, at least one energy source 114 is provided mobile work system 100, such energy source 114 including a fuel supply, as shown in FIG. 12, a fuel supply, a battery, a pressure accumulator, a fuel cell, a fly wheel device, a solar cell and/or a wind energy device.

Additionally, mobile work system 100 may include at least one body portion, generally 144 (FIG. 12), being application-specific for one or more certain tasks, or of a general utility configuration having variable uses. Such body portion 144 is connected to platform 110.

Additionally, system 100 may include at least one attachment, generally A, or 146 (FIG. 7), and such attachment 146, or components thereof, may be "smart" and/or attachment 146 may be partially or entirely of non-compliant legacy character. As noted above, as used in here "smart" or "smartness" or lack thereof is defined by the ability to comply with and operate in a set of acceptable rules for communication, control, and reaction accepted by a community of users, standards organization, etc., and/or recognized via course of an established course of dealing within an industry or subset thereof, regardless of whether those rules are of one or more official standards or of one or more commercial definitions. It is to be further understood that as used in herein, a "non-compliant legacy" attachment or characterization is one whose lack of "smartness" means a lack of compliance with the aforementioned accepted rules of communication, control and reaction. An attachment 146 is connected to energy source 142, and power output device 112 is configured to perform at least one action of performing mechanical work, providing electrical power, providing thermal power and/or providing fluid power.

Mobile work system 100 also includes at least one attachment controller, generally 148 (FIG. 12), in communication with one or more attachments 146 and is adapted for controlling the operation of such attachment(s) 146. An attachment controller 148 is operational for controlling not only controlling a smart attachment 146, but also a non-compliant legacy attachment 146. At least one user input device 150 is provided system 100 in communication with and configured for controlling platform 110 and/or one or more attachments 146, and a user interface manager 152 (FIG. 13) is connected to user input device 150 and to attachment controller 148 and is configured to automatically provide 2-way translation between user input device 150 and attachment controller 148, regardless of whether the attachment 146 being used is a smart attachment or a non-compliant legacy attachment, and without requiring a reprogramming of user input device 150 or attachment controller 148. In other words, user interface manager 152 allows a user to operate one or more attachments 146 via user input device 150, which may be located on mobile work system 100 or be remote therefrom. Additionally, user input device 115 can be connected to user interface manager 152 via wire, or wirelessly, as desired and/or as circumstances permit.

In one implementation, mobile work system 100 has a propulsion arrangement M, which includes at least one first propulsion arrangement, generally 154, and at least one second propulsion arrangement, generally 156. Each such propulsion arrangement 154, 156 may be selected from a variety of motive arrangements, such as discussed above with regard to propulsion arrangement M, namely, wheels, tracks, rollers, skids, articulated legs, etc. (FIG. 12). In certain implementations, first propulsion arrangement 154 is connected to first end 116 of platform 110, and second propulsion arrangement 156 is connected to second end 118 of platform 110.

In one example implementation, energy source 114 is an electrical energy source, such as a battery, generator, fuel cell, capacitor arrangement and/or piezo-electrical arrangement (not shown) and includes at least one of first attachment interface 120 and second attachment interface 122 including an electrical connector (not shown) to energy source 114. Also, certain implementations energy source 114, wherein energy source 114 is an electrical energy source, includes power rails, generally 158 of (FIGS. 13, 33, and 34). Additionally, energy source 114 may include an electric power configuration (not shown) and may be adapted for electric power importing and/or electric power exporting, such that mobile work system 100 can be a power provider, and provide a power output to external users, receivers, etc. and/or system 100 could be a power importer, and could be powered by an external power source, such as an alternating current power source, a direct current power source, and from sources providing such power including grid power, solar panels (photovoltaic), wind power, hydro power, nuclear power, tidal power, and/or thermal differential power. In an implementation, system 100 and/or energy source 114 can be operationally provided with an electric power takeoff (not shown) for use in connection with powering one or more attachments 146.

Mobile work system 100, in certain implementations, may include a fluid power system 160 (FIG. 31) connected to power output device and/or energy source 114 and, such fluid power system 160 may include at least one of the first or second attachment interfaces 121, 122 having a fluid power connector connected to fluid power system 160 such that such fluid power may be provided to one or more attachments 146 connected to one or more of such interfaces 120, 122. Fluid power system 160 may also include at least one pressure rail 162, for allowing multiple outputs of pressurized fluid, similar to a pressurized header and/or bus distribution system. Additionally, fluid power system 160 may include a fluid-powered power take-off, which can be used to power one or more attachments 146.

Mobile work system 100 may also include a thermal management system, generally 165 (FIG. 31) for heating and/or cooling energy source 114, and/or an operator cab, generally 166 (FIG. 15).

Mobile work system 100 may include a command and communication (CMD/COMM) bus system, generally 168 that is adapted to control power output device 112 and/or energy source 114. CMD/COMM bus system 168 may, in certain implementations, be adapted for use in the on-board and/or off-board control of energy source 112 and power output device 114. Further, bus system 168 is, in certain implementations, connected to operator controls, generally 150, in a wire or wireless manner, such bus system 110 allowing for two-way transfer of information between operator controls 150 and other components to which bus system 168 is connected.

Mobile work system 100, in various implementations includes user interface manager (UIM) 152 having multiple potential configurations and being adapted to have adapters for non-standard controls 140, and also, adapted to be in communication with onboard and/or off board, i.e., remote, operator mobility controls 150.

Further, an attachment communications bus, generally 174, is provided mobile work system 100 in certain implementations and includes multiple configurations and may include adapters for non-standard attachments, a mobility controller, a four wheel drive controller for platform 110, four wheel steering control for platform 110, and/or by wire and wireless mobility controls for platform 110.

Additionally, mobile work system 100 can include a power management communication bus 176 having the capability of powering components at various locations, the capability of powering different types of components and/or attachments 146, adapters for multiple electric chargers, and/or adapters for multiple power exports.

Mobile work system 100 may also include an energy management communications bus 178 capable of interaction with mobile energy locations and types of energy, handling multiple energy components, and/or having one or more adapters for multiple energy component controls.

Further, mobile work system 100 may include a vehicle Energy System Integrator, generally 180 (FIG. 32), having the capability of verifying power content of mobile work system 100 and conveying proper performance limits for a task to be performed by mobile work system 100 or at least one attachment 146.

Mobile work system 100 includes in certain aspects a Mobile Energy System Optimizer, generally 182 (FIG. 32), having the capability of optimizing content definitions of mobile work system 100 and of being an on board or off board task interpreter for mobile work system 100.

Returning to FIG. 1, one implementation of mobile work system 100 is shown, having platform 110, wheels with tires 190, a cover 192 over first end 116 of platform 110 and a cover 194 over second end 118 of platform 110. Handles, generally H, may be actuated to selectively remove one or both covers 192, 194. Positioned between covers 192 and 194 is power output device 112, having a hinged access panel 196 with the handle Ha for allowing access within a compartment, generally 198 enclosing power device 112 and/or energy source 114.

FIGS. 2 and 3 are views of first end 116 and second end 118 respectively and illustrate, respectively, first attachment interface 120 and second attachment interface 122. Also illustrated in FIGS. 2 and 3 are axles, generally 198, and transmission, generally 200 for selectively driving wheels 190 located at each of respective ends 116, 118. Also, FIGS. 2 and 3 show, respectively, first steering mechanism 124 and second steering mechanism 126, first steering mechanism 124 being attached to first end 116 of platform 110, and second steering mechanism 126 being attached to second end 118 of platform 110.

FIG. 4 illustrates mobile work system 100 having compartments 202 and 204, compartment 202 being positioned towards first end 116, and compartment 204 being positioned towards second end 118. Compartments 202 and 204 can be used for drive and/or control components and/or for storage.

FIG. 5 illustrates mobile work system 100 with covers 192 and 194, and also a vented portion 206 in the upper portion of compartment 197 to allow airflow to the interior compartment 197 for components such as power output device, energy source 114, etc.

FIG. 6 illustrates the underside of an implementation of mobile work system 100, and includes a view of the underside of compartments 202, 204, and also of a skid plate 208.

FIGS. 7 through 11 illustrate an implementation of mobile work system 100 which could be a version of the system of the mobile work system 100 illustrated in FIGS. 1 through 6, or another variation of such implementation. Note that platform 110 includes a first platform 110a that extends to first end 116 and a platform 110b that extends to second end 118. Upper surfaces of portions 110a and 110b include attachment openings, generally 110c to which brackets, tie downs, releasable clips, etc. (none shown) could be attached for securing cargo and/or for securing components such as a cab 166, attachments 146, applications specific body portions 144, etc.

As can be seen above, mobile work system 100, in certain implementations, is an end-application product that includes: (a) a set of user controls, generally 1, which may or may not be application-specific and which may or may not be contained within (b) an application-specific body 144, which body may be loadbearing, to which attachment 146 may be affixed and which itself receives mechanical support, mobility, power, and energy storage/management functionalities from (c) an underlying mobile power and energy system, which may include power output device 112 and energy source 114, and (d) any number of attachments 146 from a broad set of attachments 146 that (i) may be mechanically affixed to platform 110 (which may have one or more frame members) and (ii) receive and/or input power from the electrical source 114 and/or one or more fluid power systems 160 provided as components of mobile work system 100. The relationship between the user controls 1, application specific body 144, platform 110, and attachments (accessories) 146 is shown in FIG. 12. In this figure, the various permutations of implementations of mobile work system 100 may be created or illustrated. For example, platform 110 could include fluid power, electric power, thermal power, and could be controlled wirelessly, or by wire, and could include mechanical supports, such as frame members, if desired and/or if circumstances dictate.

Additionally, accessories 146 can be provided in an ambidextrous or secular manner to first end 116 and second end 118 without regard for direction of travel, steering, center of gravity considerations (since mobile work system 100 has a near 50/50 weight distribution). Accordingly, accessories such as a truck body, which may include a dump bed, lifts, cranes, platforms, etc., could be added to one or more ends of ends 116, 118 of platform 110. Similarly end-of-frame accessories, such as hitches, and tailgates, could likewise be provided either end 116, 118 as could also agricultural implements, industrial implements, forklift masks, front loaders, skid steer attachments, and/or other attachments 146.

As shown in FIG. 13, various other components and/or subsystems of mobile work system 100 are illustrated. For example, user interface manager 152 could have inputs from display 1, display 2 and mobility joy stick, attachment 1 joystick, attachment 2 joystick, attachment 3 of an independent device, a wireless interface, a global system for mobile communications (GSM) plus global navigation satellite system (GNSS) interface, and/or electric stop switch. Additionally, the user interface manager 172 could receive inputs from a chassis gearbox controller, attachment 1 controller, attachment 2 controller, controller adapter 3, attachment 3 controller, controller adapter 4, attachment 4 controller, and/or a diagnostic connector to which diagnostic equipment (not shown) could be connected.

Further inputs to user interface manager 172 could be from power manager 173, a chassis hydraulic power unit (HPU) motor inverter, traction motor inverter, auxiliary power unit (APU), charger/exporter inverter, low voltage (LV) power distribution module, refrigerant compressor (REFRC&P) motor inverter, one or more coolant pumps, high voltage (HV) power distribution module, and/or HPU motor inverter. An energy manager may also be in communication with power manager 173 and user interface manager 172, and inputs into energy manager—could include battery pack 1, battery pack 2, battery pack N, and/or fuel tank 1. Additionally, energy manager 175 could be in communication with HV power distribution module, and HV power distribution module can be interconnected to an HVDC power bus as well as the charger/expert converter. Furthermore, an AC power bus instead of, or in addition to the DC power bus could be provided and in communication with charger/export inverter. Furthermore, HPU pump motor can be in communication with hydraulic pressure rail 162 both of which being in communication with HV motor inverter.

Implementations of motor platform systems and methods disclosed herein include, an end-user/OEM open interface layer; a platform integration software layer, and in some implementations, a supplier-specific component interface layer for attachments 146 and/or other manufacturer-specific components. With regard to FIG. 12, the connectivity diagram shown illustrates the control relationship between platform integration management models, namely the user interface manager 172, the power manager 173, and the energy manager 175 and other components of systems, with off-the-shelf supplier software and user/OEM software in user interface manager 172, together with integration software layer. Control adapters 177 (FIG. 33) reside between the attachment control bus 179 and attachment 3 controller and attachment 4 controller. These control adapters 177 facilitate use of non-compliant legacy attachments providing full compatibility with mobile work system 100.

Mobile platform systems in method with the present disclosure include an end-user/OEM open interface having: (a) a mechanical frame interface for mobile application mechanical support; (b) electrical and fluid power interfaces for application/attachment 146 power; (c) mechanical, electrical, and fluid interfaces for connection of the platform to energy components or systems; (d) thermal management interfaces to support application/attachment 146 thermal management needs; and (e) an open, wireless or wired interface that (i) accepts commands to provide mobility functions through platform power train and chassis systems; (ii) accepts commands to accept importing of energy (through electrical charging) and/or to export/supply power through platform electrical and fluid power supply interfaces; (iii) provides connectivity for user retrieval of information for monitoring of platform and attached systems and/or for diagnosis of issues related to such systems; and (iv) is flexible with respect to end-user or OEM choice of end-user controls.

Such interface layer is a collection interfaces that are open in the sense that an end-user or OEM will have access to their respective definitions and guidelines for use. End-users and OEMs, consequently, are free to use their own application-specific and/or general utility bodies 144 and attachments 146 if they so choose. Furthermore, implementations of mobile work system 100 include an open frame to accept suspension/steering-bearing subframes of the end user's choice at either or both ends 116, 118, again, because system 100 has no actual "front" or "rear" end, but is instead ambidextrous/secular in that sense.

Implementations of mobile work system 100 may not include end-user controls, but its open interface system facilitates the implementation of mobile applications for which varied, but unique, user controls or control sets are appropriate on an application specific user interface manager 172 allows end-users or OEMs to mix and match user input devices 150 and attachment controllers 148 without the need to reprogram individual input devices or controllers for communication capability, i.e., the user interface manager provides the necessary two way translation. Since the user interface manager is to be programmable by the end-user or OEM, its hardware is part of the open interface, and its software can be proprietary to be respective end-user or OEM, if desired. Certain implementations of the user interface manager, its functionalities are manifested through distribution of the user input manager's translation functions to per-input or per controller adapters. Input devices and attachment controllers compliant to open interface rules are attachable directly to the user interface controller area network (CAN) or attachment control CAN bus. Attachments 146 that lack compatibility, such as non-compliant legacy attachments and/or legacy input devices for attachment controllers, may attach by routing through interface adapters that provide compatibility. Implementations of platform integration software layer determine how the platform mobility, power, and energy systems interact with each other. Inherently, the chassis/gear box controller controls virtually all platform mobility responses to user input requests as well as the flow of motion feedback information to the user. The power manager receives commands from and sends feedback to the user interface manager and controls all platform power management, including supervision of all power components (motors and their inverters, power import/export/distribution components, APUs, etc). Note that how the power manager manages power flow may be proprietary, if desired, and how a power source may connect and communicate with the power manager, and thus the system 100, however, is open, and all sources of power for import to system 100 appear to the power manager as SAE J1772 chargers, each separately identifiable on the power train-CAN bus.

Referring to FIG. 33, mobile work system 100 in certain implementations, includes distributed user interface management to the use of per-unit/per-controller adapters. This arrangement allows the power manager 173 the flexibility of interaction with power sources, regardless of a power source location, i.e., whether such power is onboard or off-board. This arrangement also allows the power manager flexibility to interact with power sources, regardless of the power source type, such as an internal combustion generator, a fuel cell, a solar power interface, Level 2 alternating current versus Level 1 direct current, etc. Further, the arrangement allows the power manager flexibility to interact with multiple power sources simultaneously. If the onboard SAE J1772 charging interface for a source does not have the ability to assume a powertrain-CAN node address different from other charging interface nodes, the software architecture provides for the inclusion of a charger interface CAN adapter to shift the powertrain-CAN address of the subject charger, invisibly to that charger. If necessary, such shifting may be achieved through use of 1:1 bus routers, such as an Axiomatic AX140X00 protocol converter, sold by Axiomatic Technologies Corporation, of Mississauga, Ontario, Canada. In certain implementations, the energy manager controls all platform energy management, including supervision and energy components, such as battery packs, fuel tanks, pumps, etc. The energy manager receives commands from, and sends feedback to, the power manager and controls primary platform energy management, including supervision of all energy storage components, battery packs, fuel tanks, fuel pumps, etc. How energy source may connect and communicate with the energy manager, and thus the mobile work system 100, is open in certain implementations, i.e., all repositories of energy for import to or export from system 100 appear to the energy manager as separately identifiable on the battery-CAN bus. For safety back-up reasons, the energy manager monitors energy feedback and has authority to exercise secondary/backup energy source shutdown/shutoff. This arrangement allows the energy manager the flexibility of interaction with energy storage components, regardless of energy storage component location, whether onboard or off-board system 100. Further, this arrangement allows the energy manager the flexibility to interact with multiple energy storage components whose natures are dependent on the type(s) of their associated power sources. For example, if an energy does not have the ability to assume a battery-CAN node address different from other energy source CAN node IDs, system 100 allows for the inclusion of an energy storage interface CAN adapted to shift the battery-CAN address of its subject energy storage device, invisibly to that energy storage device. If necessary, such shifting may be achieved through use of 1:1 bus routers, and again, for example, using an Axiomatic AX140X00 protocol converter, etc.

The chassis/gearbox controller, power manager, and energy manager may all reside within off the shelf (OTS)

electronic control modules whose interface and programming tools are proprietary to their respective suppliers. However, the application software created and/or downloaded to these electronic control models through use of supplier's tools may or may not be proprietary.

FIG. 34 is another implementation of the system shown in FIG. 33 and depicts the generic architecture with multiple power sources, as well as multiple, varied energy storage devices.

The supplier-particular component interface layer defines how the mobile work system 100's mobility, power, and energy systems interact with their constituent components. Since virtually all components may be off-the-shelf, the proprietary nature of the system/component interfaces are subject to supplier discretion. It may be in practice that these system/component interfaces are closed and that requestors for component interface information will need to gain access to such from the respective component suppliers (even if it is publicly known that a component interface is open).

FIG. 14 illustrates another example implementation of the mobile platform system 100a, having a flatbed upper surface 228 and cooling and power electronics in side-located compartments 230.

FIG. 15 illustrates another example implementation of a mobile platform system 100b, having a cooling system and a power system in a compartment 234 adjacent an operator cab 166, operator cab 166 being adjacent a platform bed 236.

FIG. 16 illustrates another example implementation of a mobile platform system 100c, having a cab at an extreme end, and a cooling system, electronic system carried in a compartment 240 adjacent the cab, and a platform bed adjacent compartment 240.

FIG. 17 illustrates another example implementation of a mobile platform system 100d, having a cab at its extreme end, a cooling system and electronic system compartment 240 adjacent a cab, and a tank or other container 242 on a platform bed adjacent the compartment.

FIG. 18 illustrates another example implementation of a mobile platform system 100e, having a narrowed cab 166a, with a cooling system and/or electronics system compartment 240 adjacent the cab, and open chassis rails 244 or platform adjacent the compartment.

FIG. 19 illustrates another example implementation of a mobile platform system 100f of the present disclosure, having a bucket and/or loader 246 at one extreme end of the platform system, with a narrowed cab between arms of such bucket/loader, with a cooling system/electronic system compartment adjacent the cab, and open chassis rails adjacent the compartment, it being understood that this implementation can be equipped to carry accessories with SAE J2513 skid steer accessory interfaces.

FIG. 20 illustrates another example implementation of a mobile platform system 100g, with a boom and/or front loader 248, with arms extending to either side of a narrow cab, a cooling system/electronic system compartment adjacent the cab, and a platform bed adjacent the cab, it being understood that this implementation is equipped to carry accessories with SAE J2513 skid steer accessory interfaces, as can be provided to other implementations discussed above and otherwise disclosed herein.

FIG. 21 illustrates another example implementation of a mobile platform system 100h, with a narrowed cab at one extreme end of the platform system, a cooling system/electronic system compartment adjacent the narrowed cab, and a long bed with a cover adjacent the compartment, and tracks 250 carrying the platform for mobility.

FIG. 22 illustrates another example implementation of a mobile platform system 100i, with a cab at one extreme end, a crane 252 midway-mounted on a platform bed, and a cooling system/electronics system compartment at the other extreme end of the platform.

FIG. 23 illustrates another example implementation of a mobile platform system 100j, with a cab on one extreme end of a platform, a mid-mounted cooling system/electronic system compartment, and a platform bed adjacent such compartment.

FIG. 24 illustrates another example implementation of a mobile platform system 100k, having a lift mast 254 at one extreme end of the platform, a cab on the platform adjacent the lift mast, a mid-mounted cooling system/electronics system compartment, and a dump bed adjacent such compartment.

FIG. 25 illustrates another example implementation of a mobile platform system 100l, having a bucket loader 256 on one extreme end of the platform system with a narrowed cab between articulated arms of such bucket loader, a cooling system/electronics system compartment adjacent the cab; and a dump bed 258 adjacent the compartment, the platform being carried on quad tracks 260.

FIG. 26 illustrates another example implementation of a mobile platform system 100m, having a narrowed cab on one extreme end of the platform, a cooling system/electronics system compartment positioned between the cab and a bed with a cover, the platform being carried on halftracks 262 at one end thereof and skis or skids 264 at the other end thereof.

FIG. 27 illustrates another example implementation of a mobile platform system 100n, with an auxiliary power unit 266 and operator station, a mid-mounted cooling system/electronics system compartment 268, and a platform bed adjacent such compartment.

FIG. 28 illustrates another example implementation of a mobile platform system 100p, with a platform bed adjacent one extreme end and another platform bed adjacent the other extreme end, with a mid-mounted cooling system/electronics system compartment 268 between such platform beds.

FIG. 29 illustrates another example implementation of a mobile platform system 100q, with a mid-mounted cooling system/electronics system compartment, covered platform bed portions, one being adjacent each end of the platform, such mobile platform system being remote controlled.

FIG. 30 illustrates another example implementation of a mobile platform system 100r, with a platform having a mid-mounted cooling system/electronics system compartment, a covered platform bed adjacent each end of the platform, and an accessory compartment 270 extending beyond the extreme end of each end of the platform, such accessory compartment containing maximum power point tracking (MPPT) electronics, fast charged electric vehicle supply equipment (EVSE), and other equipment for use in connection battery buffing of one or more photovoltaic and/or wind charging stations.

The systems and/or methods described herein provide mobile work platforms having capable of multiple work configurations. More specifically, the herein-described systems and methods provide flexible mobile platform systems that reduce or eliminate the necessity of multiple mobile work machines to achieve a broad range of uses.

Although specific features of various examples of the invention may be shown in some drawings and not in others, this is for convenience only. In accordance with the principles of the invention, any feature of a drawing may be referenced and/or claimed in combination with any feature of any other drawing.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art who may or may not choose to draw from the following U.S. Pat. No. 7,603,207, of Abraham et al; U.S. Pat. No. 9,648,808, of Force; U.S. Pat. No. 8,593,102, of McGuire et al; U.S. Pat. No. 9,780,579, of Frankenberger; U.S. Pat. No. 5,521,588, of Kuehner et al; U.S. Pat. No. 6,061,617, of Berger, et al.; U.S. Pat. No. 8,602,153, of Osswald, et al; U.S. Pat. No. 7,230,819, of Muchow, et al; and Published Patent Application Publication Nos. US2014/285005, of Casteel; US2018/0057004, of Muldoon, et al; US2017/0174092, of Kohnke; US2009/0171482, of Mindeman; US2015/0045992, of Ashby; US2010/0206354, of Greene; White Paper 20 of Schneider Electric, The Different Types of AC Power Connectors in North America (Rev. 2), http://www.apc.com/salestools/SADE-5TNRML/SADE-5TNRML_R2_EN.pdf; and Precision AG Product products (http://www.wrightimp.com/Precision-Ag/Precision-Ag-Product.aspx) from Wright Implement, of Owensboro, Ky.; ISO 11783, Tractors and Machinery for Agriculture and Forestry—Serial Control and Communications Data Network ("ISO Bus" or "ISOBUS"), a communication protocol for the agriculture industry based on the SAE J1939 protocol (which includes CANbus), https://en.wikipedia.org/wiki/ISO_11783, the entirety of all of the foregoing being incorporated herein by reference. Such other examples are intended to be within the scope of the claims if they have structural elements that do not differ from the literal language of the claims, or if they include equivalent structural elements with insubstantial differences from the literal languages of the claims.

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. A mobile work system adapted for operationally receiving at least one attachment configured to perform work and/or to provide an energy output, the mobile work system comprising:
   a platform powered by at least one power output device;
   at least one energy source operationally connected to the at least one power output device, wherein the at least one energy source is an electrical energy source that includes power rails;
   the platform defining a first portion and a second portion spaced from the first portion;
   a first attachment interface connected to the first portion of the platform and adapted for receipt of the at least one attachment;
   a second attachment interface connected to the second portion of the platform and adapted for receipt of the at least one attachment;
   the first attachment interface and the second attachment interface being substantially operationally identical to one another;
   a first steering mechanism connected to the first portion of the platform;
   a second steering mechanism connected to the second portion of the platform;
   at least one propulsion arrangement connected to the platform selected from a group consisting of wheels, tracks, rollers, skids, and articulated legs;
   the first steering mechanism and the second steering mechanism being substantially operationally equivalent to one another in steering the first portion and the second portion, respectively; and
   whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

2. The mobile work system of claim 1, wherein the at least one power output device is selected from a group consisting of a diesel engine, a gasoline engine, an electric motor, a pump, a fluid motor, and a hybrid power configuration.

3. The mobile work system of claim 1, wherein the at least one energy source is selected from a group consisting of a fuel supply, a battery, a pressure accumulator, a fuel cell, a fly wheel device, a solar cell, and a wind energy device.

4. The mobile work system of claim 1, further comprising at least one application-specific body portion connected to the platform.

5. The mobile work system as defined in claim 1, further comprising:
   at least one smart attachment or non-compliant legacy attachment; and
   at least one attachment controller in communication with the at least one smart attachment or non-compliant legacy attachment and adapted for controlling the operation of the attachment.

6. The mobile work system as defined in claim 1, wherein the at least one propulsion arrangement includes:
   at least one first propulsion arrangement connected to the first portion of the platform selected from a group consisting of wheels, tracks, rollers, skids, and articulated legs; and
   at least one second propulsion arrangement connected to the second portion of the platform selected from a group consisting of wheels, tracks, rollers, skids, and articulated legs.

7. The mobile work system as defined in claim 1, wherein the at least one energy source is an electrical energy source and at least one of the first attachment interface and the second attachment interface includes an electrical connector connected to the at least one energy source.

8. The mobile work system as defined in claim 1, wherein the at least one energy source is an electrical energy source that includes an electric power system configuration.

9. The mobile work system as defined in claim 1, wherein the at least one energy source is an electrical energy source that includes an electric power system configuration adapted for at least one of electric power importing and electric power exporting.

10. The mobile work system as defined in claim 1, wherein the at least one energy source is an electrical energy source and further comprising an electric power take-off.

11. The mobile work system as defined in claim 1, further comprising a fluid power system and at least one of the first attachment interface and the second attachment interface includes a fluid power connector connected to the fluid power system.

12. The mobile work system as defined in claim 1, further comprising a fluid power system having at least one pressure rail.

13. The mobile work system as defined in claim 1, further comprising a fluid power system and a fluid powered power take-off connected to the fluid power system.

14. The mobile work system as defined in claim 1, further comprising a thermal management system for heating and cooling the at least one energy source.

15. The mobile work system as defined in claim 1, further comprising an open command and communication bus system that is configured to control at least one of the at least one energy source and the at least one power output device.

16. The mobile work system as defined in claim 1, further comprising an open command and communication bus system that is configured for use in onboard and off-board control of at least one of the at least one energy source and the at least one power output device.

17. The mobile work system as defined in claim 1, further comprising:
an open command and communication bus system; and
operator controls configured to be in communication with the open command and communication bus system.

18. The mobile work system as defined in claim 1, further comprising:
an open command and communication bus system; and
operator controls configured to be in wired or wireless communication with the open command and communication bus system.

19. The mobile work system as defined in claim 1, further comprising a user interface manager.

20. The mobile work system as defined in claim 1, wherein:
the first portion of the platform is a first end of the platform;
the second portion of the platform is a second end of the platform; and
the second end of the platform is generally opposite the first end of the platform.

21. A mobile work system adapted for operationally receiving at least one attachment configured to perform work or to provide an energy output, the mobile work system comprising:
a platform powered by at least one power output device;
at least one energy source operationally connected to the at least one power output device;
the platform defining a first portion and a second portion spaced from the first portion;
a first attachment interface connected to the first portion of the platform and adapted for receipt of the at least one attachment;
a second attachment interface connected to the second portion of the platform and adapted for receipt of the at least one attachment;
the first attachment interface and the second attachment interface being substantially operationally identical to one another;
a first steering mechanism connected to the first portion of the platform;
a second steering mechanism connected to the second portion of the platform;
at least one propulsion arrangement connected to the platform selected from a group consisting of wheels, tracks, rollers, skids, and articulated legs;
the first steering mechanism and the second steering mechanism being substantially operationally equivalent to one another in steering the first portion and the second portion, respectively;
at least one smart attachment or non-compliant legacy attachment; and
whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

22. The mobile work system as defined in claim 21, wherein the smart attachment is connected to at least one of the energy source and the power output device and is configured to perform at least one action of performing mechanical work, providing electrical power, providing thermal power, or providing fluid power.

23. The mobile work system as defined in claim 21, wherein the non-compliant legacy attachment is connected to at least one of the energy source and the power output device and is configured to perform at least one action of performing mechanical work, providing electrical power, providing thermal power, or providing fluid power.

24. The mobile work system as defined in claim 21, further comprising at least one attachment controller in communication with the smart attachment and adapted for controlling the operation of the smart attachment.

25. A mobile work system as defined in claim 21, further comprising at least one user input device in communication with and configured for controlling at least one of the platform, the smart attachment, and the non-compliant legacy attachment.

26. A mobile work system as defined in claim 25, further comprising:
a user interface manager connected to the user input device and to the attachment controller and configured to automatically provide two-way translation between the user input device and the attachment controller, regardless of whether the attachment is a smart attachment or a non-compliant legacy attachment and without requiring a reprogramming of the user input device or the attachment controller, and wherein the user interface manager allows a user to operate the attachment via the user input device.

27. A mobile work system adapted for operationally receiving at least one attachment configured to perform work or to provide an energy output, the mobile work system comprising:
a platform powered by at least one power output device;
at least one energy source operationally connected to the at least one power output device;
the platform defining a first portion and a second portion spaced from the first portion;
a first attachment interface connected to the first portion of the platform and adapted for receipt of the at least one attachment;
a second attachment interface connected to the second portion of the platform and adapted for receipt of the at least one attachment;
the first attachment interface and the second attachment interface being substantially operationally identical to one another;
a first steering mechanism connected to the first portion of the platform;
a second steering mechanism connected to the second portion of the platform;

at least one propulsion arrangement connected to the platform selected from a group consisting of wheels, tracks, rollers, skids, and articulated legs;
the first steering mechanism and the second steering mechanism being substantially operationally equivalent to one another in steering the first portion and the second portion, respectively;
a fluid power system; and
whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

28. A mobile work system adapted for operationally receiving at least one attachment configured to perform work or to provide an energy output, the mobile work system comprising:
a platform powered by at least one power output device;
at least one energy source operationally connected to the at least one power output device;
the platform defining a first portion and a second portion spaced from the first portion;
a first attachment interface connected to the first portion of the platform and adapted for receipt of the at least one attachment;
a second attachment interface connected to the second portion of the platform and adapted for receipt of the at least one attachment;
the first attachment interface and the second attachment interface being substantially operationally identical to one another;
a first steering mechanism connected to the first portion of the platform;
a second steering mechanism connected to the second portion of the platform;
at least one propulsion arrangement connected to the platform selected from a group consisting of wheels, tracks, rollers, skids, and articulated legs;
the first steering mechanism and the second steering mechanism being substantially operationally equivalent to one another in steering the first portion and the second portion, respectively;
a thermal management system; and
whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

29. A mobile work system adapted for operationally receiving at least one attachment configured to perform work or to provide an energy output, the mobile work system comprising:
a platform powered by at least one power output device;
at least one energy source operationally connected to the at least one power output device;
the platform defining a first portion and a second portion spaced from the first portion;
a first attachment interface connected to the first portion of the platform and adapted for receipt of the at least one attachment;
a second attachment interface connected to the second portion of the platform and adapted for receipt of the at least one attachment;
the first attachment interface and the second attachment interface being substantially operationally identical to one another;
a first steering mechanism connected to the first portion of the platform;
a second steering mechanism connected to the second portion of the platform;
at least one propulsion arrangement connected to the platform selected from a group consisting of wheels, tracks, rollers, skids, and articulated legs;
the first steering mechanism and the second steering mechanism being substantially operationally equivalent to one another in steering the first portion and the second portion, respectively;
an open command and communication bus system; and
whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

30. A mobile work system adapted for operationally receiving at least one attachment configured to perform work or to provide an energy output, the mobile work system comprising:
a platform powered by at least one power output device;
at least one energy source operationally connected to the at least one power output device;
the platform defining a first portion and a second portion spaced from the first portion;
a first attachment interface connected to the first portion of the platform and adapted for receipt of the at least one attachment;
a second attachment interface connected to the second portion of the platform and adapted for receipt of the at least one attachment;
the first attachment interface and the second attachment interface being substantially operationally identical to one another;
a first steering mechanism connected to the first portion of the platform;
a second steering mechanism connected to the second portion of the platform;
at least one propulsion arrangement connected to the platform selected from a group consisting of wheels, tracks, rollers, skids, and articulated legs;
the first steering mechanism and the second steering mechanism being substantially operationally equivalent to one another in steering the first portion and the second portion, respectively;
a user interface manager having multiple configurations; the user interface manager having adaptors for non-standard controls; and the user interface manager being configured to be in communication with onboard controls or remote mobility controls; and
whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

31. A mobile work system adapted for operationally receiving at least one attachment configured to perform work or to provide an energy output, the mobile work system comprising:
- a platform powered by at least one power output device;
- at least one energy source operationally connected to the at least one power output device;
- the platform defining a first portion and a second portion spaced from the first portion;
- a first attachment interface connected to the first portion of the platform and adapted for receipt of the at least one attachment;
- a second attachment interface connected to the second portion of the platform and adapted for receipt of the at least one attachment;
- the first attachment interface and the second attachment interface being substantially operationally identical to one another;
- a first steering mechanism connected to the first portion of the platform;
- a second steering mechanism connected to the second portion of the platform;
- at least one propulsion arrangement connected to the platform selected from a group consisting of wheels, tracks, rollers, skids, and articulated legs;
- the first steering mechanism and the second steering mechanism being substantially operationally equivalent to one another in steering the first portion and the second portion, respectively;
- an attachment communications bus having multiple configurations; the attachment communications bus having at least one adaptor configured for the following: non-standard attachments; a mobility controller; four wheel drive; four wheel steering; by-wire mobility controls; and by-wireless mobility controls; and
- whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

32. A mobile work system adapted for operationally receiving at least one attachment configured to perform work or to provide an energy output, the mobile work system comprising:
- a platform powered by at least one power output device;
- at least one energy source operationally connected to the at least one power output device;
- the platform defining a first portion and a second portion spaced from the first portion;
- a first attachment interface connected to the first portion of the platform and adapted for receipt of the at least one attachment;
- a second attachment interface connected to the second portion of the platform and adapted for receipt of the at least one attachment;
- the first attachment interface and the second attachment interface being substantially operationally identical to one another;
- a first steering mechanism connected to the first portion of the platform;
- a second steering mechanism connected to the second portion of the platform;
- at least one propulsion arrangement connected to the platform selected from a group consisting of wheels, tracks, rollers, skids, and articulated legs;
- the first steering mechanism and the second steering mechanism being substantially operationally equivalent to one another in steering the first portion and the second portion, respectively;
- a power management and communications bus having at least one of the following: the capability of powering component locations; the capability of powering different types of components; adapters for multiple chargers; and adapters for multiple power exporters; and
- whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

33. A mobile work system adapted for operationally receiving at least one attachment configured to perform work or to provide an energy output, the mobile work system comprising:
- a platform powered by at least one power output device;
- at least one energy source operationally connected to the at least one power output device;
- the platform defining a first portion and a second portion spaced from the first portion;
- a first attachment interface connected to the first portion of the platform and adapted for receipt of the at least one attachment;
- a second attachment interface connected to the second portion of the platform and adapted for receipt of the at least one attachment;
- the first attachment interface and the second attachment interface being substantially operationally identical to one another;
- a first steering mechanism connected to the first portion of the platform;
- a second steering mechanism connected to the second portion of the platform;
- at least one propulsion arrangement connected to the platform selected from a group consisting of wheels, tracks, rollers, skids, and articulated legs;
- the first steering mechanism and the second steering mechanism being substantially operationally equivalent to one another in steering the first portion and the second portion, respectively;
- an energy management and communications bus having at least one of the following: the capability of interacting with multiple energy locations and multiple types of energy; the capability of handling multiple energy components; and an adaptor for multiple energy component controls; and
- whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

34. A mobile work system adapted for operationally receiving at least one attachment configured to perform work or to provide an energy output, the mobile work system comprising:
- a platform powered by at least one power output device;
- at least one energy source operationally connected to the at least one power output device;
- the platform defining a first portion and a second portion spaced from the first portion;

a first attachment interface connected to the first portion of the platform and adapted for receipt of the at least one attachment;
a second attachment interface connected to the second portion of the platform and adapted for receipt of the at least one attachment;
the first attachment interface and the second attachment interface being substantially operationally identical to one another;
a first steering mechanism connected to the first portion of the platform;
a second steering mechanism connected to the second portion of the platform;
at least one propulsion arrangement connected to the platform selected from a group consisting of wheels, tracks, rollers, skids, and articulated legs;
the first steering mechanism and the second steering mechanism being substantially operationally equivalent to one another in steering the first portion and the second portion, respectively;
a vehicle energy system integrator (VESI) having at least one of the following: the capability of verifying proper content of the mobile work system and the capability of conveying predetermined performance limits for a task performed by the mobile work system or at least one attachment; and
whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

35. A mobile work system adapted for operationally receiving at least one attachment configured to perform work or to provide an energy output, the mobile work system comprising:
a platform powered by at least one power output device;
at least one energy source operationally connected to the at least one power output device;
the platform defining a first portion and a second portion spaced from the first portion;
a first attachment interface connected to the first portion of the platform and adapted for receipt of the at least one attachment;
a second attachment interface connected to the second portion of the platform and adapted for receipt of the at least one attachment;
the first attachment interface and the second attachment interface being substantially operationally identical to one another;
a first steering mechanism connected to the first portion of the platform;
a second steering mechanism connected to the second portion of the platform;
at least one propulsion arrangement connected to the platform selected from a group consisting of wheels, tracks, rollers, skids, and articulated legs;
the first steering mechanism and the second steering mechanism being substantially operationally equivalent to one another in steering the first portion and the second portion, respectively;
a mobile energy system optimizer (MESO) having at least one of the following: the capability of optimizing content definitions of the mobile work system and the capability of being an onboard or off-board task interpreter; and
whereby the platform is configured to be propelled by the at least one propulsion arrangement in a first direction leading from the first portion of the platform and in a second direction leading from the second portion of the platform and be steered by the first steering mechanism and by the second steering mechanism in a manner generally equivalent to one another.

* * * * *